US012752558B2

(12) United States Patent
Noda

(10) Patent No.: US 12,752,558 B2
(45) Date of Patent: Oct. 6, 2026

(54) RECORDING DEVICE

(71) Applicant: SEIKO EPSON CORPORATION, Tokyo (JP)

(72) Inventor: Kazuhito Noda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 18/781,828

(22) Filed: Jul. 23, 2024

(65) Prior Publication Data

US 2025/0033390 A1 Jan. 30, 2025

(30) Foreign Application Priority Data

Jul. 25, 2023 (JP) ................................ 2023-120839

(51) Int. Cl.
*B41J 29/02* (2006.01)
*B41J 29/12* (2006.01)
*B65H 29/24* (2006.01)

(52) U.S. Cl.
CPC ............... *B41J 29/02* (2013.01); *B41J 29/12* (2013.01); *B65H 29/246* (2013.01)

(58) Field of Classification Search
CPC . B41J 2/175; B41J 1/1752; B41J 29/02; B41J 29/13; B41J 29/377; B41J 29/12; B41J 2202/20; B65H 3/0661
See application file for complete search history.

(56) References Cited

U.S. PATENT DOCUMENTS 9,434,175 B2 * 9/2016 Nagashima .......... B41J 2/17563
12,358,307 B2 * 7/2025 Morisawa ................ B41J 13/02
12,441,124 B2 * 10/2025 Glennon Benjamin .................... B41J 11/00212
2019/0047306 A1 * 2/2019 Sasaki .................... B41J 29/377
2020/0047512 A1 2/2020 Kida et al.
2022/0258470 A1 * 8/2022 Toya .................... B41J 2/14233
2023/0094884 A1 3/2023 Misawa

FOREIGN PATENT DOCUMENTS

JP 2020-026073 A 2/2020
JP 2023-051684 A 4/2023

* cited by examiner

*Primary Examiner* — John P Zimmermann
(74) *Attorney, Agent, or Firm* — WORKMAN NYDEGGER

(57) ABSTRACT

The recording device has a recording section that records an image on a medium by ejecting liquid onto the medium; a supply section that supplies liquid to the recording section; a substrate unit; and a frame to which the substrate unit is attached, wherein the frame is located between the supply section and the substrate unit, and the substrate unit is attached to the frame so as to define a flow space through which air flows between the substrate unit and the frame.

20 Claims, 30 Drawing Sheets

RECORDING DEVICE

The present application is based on, and claims priority from JP Application Serial Number 2023-120839, filed Jul. 25, 2023, the disclosure of which is hereby incorporated by reference herein in its entirety.

BACKGROUND

1. Technical Field

The present disclosure relates to a recording device.

2. Related Art

JP-A-2023-051684 describes a recording device provided with a recording section that records an image on a medium by ejecting liquid, a supply section that supplies liquid to the recording section, and a substrate unit. For example, the substrate unit includes a control substrate, a power supply substrate, and the like.

In such a recording device, there is a possibility that heat from the substrate unit may reach the supply section. When the supply section is heated by the substrate unit, liquid is heated to a high temperature. In this case, the recording section may not be able to eject the liquid normally due to a change in viscosity of the liquid or generation of bubbles in the liquid.

SUMMARY

A recording device that solves the above problems includes a recording section that records an image on a medium by ejecting liquid onto the medium; a supply section that supplies liquid to the recording section; a substrate unit; and a frame to which the substrate unit is attached, wherein the frame is located between the supply section and the substrate unit, and the substrate unit is attached to the frame so as to define a flow space through which air flows between the substrate unit and the frame.

DESCRIPTION OF EMBODIMENTS

Hereinafter, an embodiment of a recording device will be described with reference to the drawings. The recording device is, for example, an inkjet printer that records images such as characters and photographs by ejecting ink, which is an example of a liquid, onto a medium such as a sheet or fabric.

Recording Device

Figure 1:
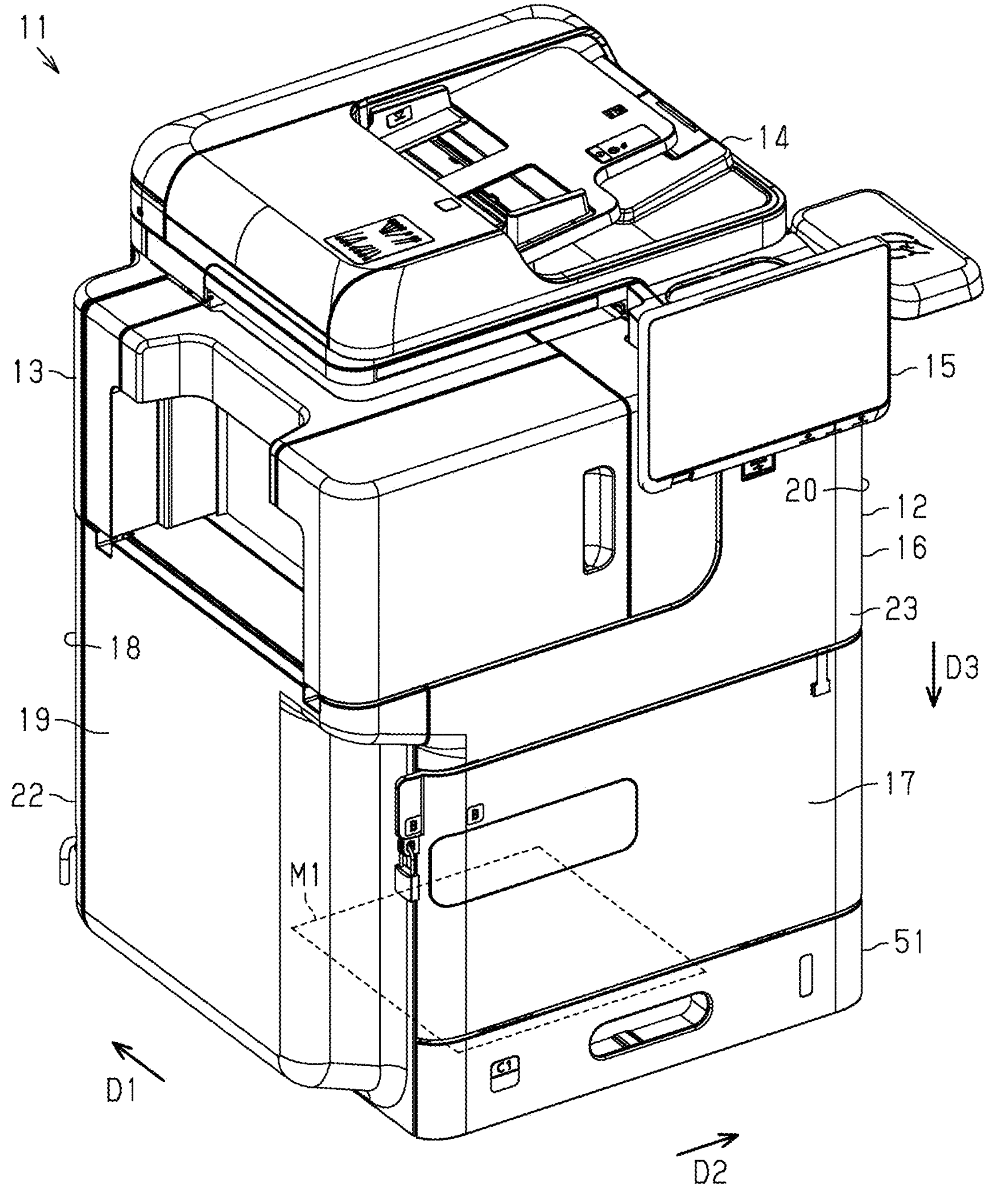
FIG. 1 is a perspective view showing an embodiment of a recording device.

As shown in FIG. 1, a recording device 11 includes a device main body 12. The device main body 12 is configured to record an image on the medium M1. The device main body 12 will be described in detail later. The recording device 11 may be a multifunctional machine having not only a function of recording an image on the medium M1 but also other functions.

The recording device 11 may include a process section 13. The process section 13 is configured to perform processing to the medium M1 recorded by the device main body 12. The process section 13 performs staple process, punch process, and the like on the recorded medium M1, for example. The process section 13 is mounted on the device main body 12. The process section 13 is mounted on an upper portion of the device main body 12. The process section 13 may hold or discharge the processed medium M1. The recording device 11 may include a discharge tray that receives the processed medium M1.

The recording device 11 may include a reading section 14. The reading section 14 is configured to read an image recorded on a document. The reading section 14 is a scanner. The reading section 14 sequentially reads images by automatically feeding the set documents. The reading section 14 is mounted on the device main body 12. The reading section 14 is mounted on the upper portion of the device main body 12. The reading section 14 is located above the process section 13. The reading section 14 overlaps with the device main body 12 when viewed from a vertical direction D3.

The recording device 11 includes an operation section 15. The operation section 15 is an interface for the user to operate the recording device 11. The operation section 15 is, for example, a touch panel. The operation section 15 may include a button, a lever, a switch, and the like. The operation section 15 is located on a front side of the device main body 12, the process section 13, and the reading section 14.

Device Main Body

Figure 2:
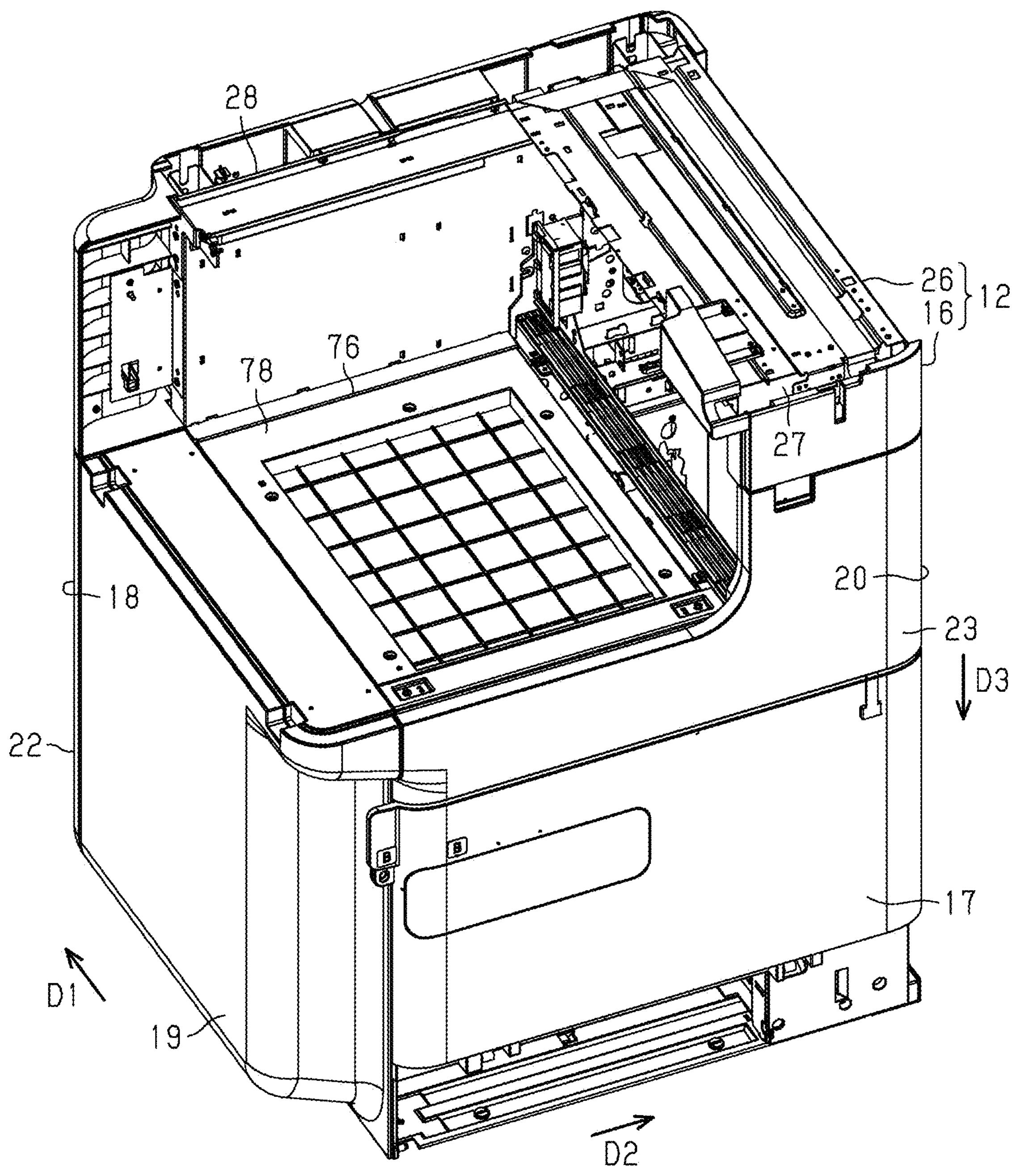
FIG. 2 is a perspective view in which a process section and a reading unit are removed from FIG. 1.
Figure 3:
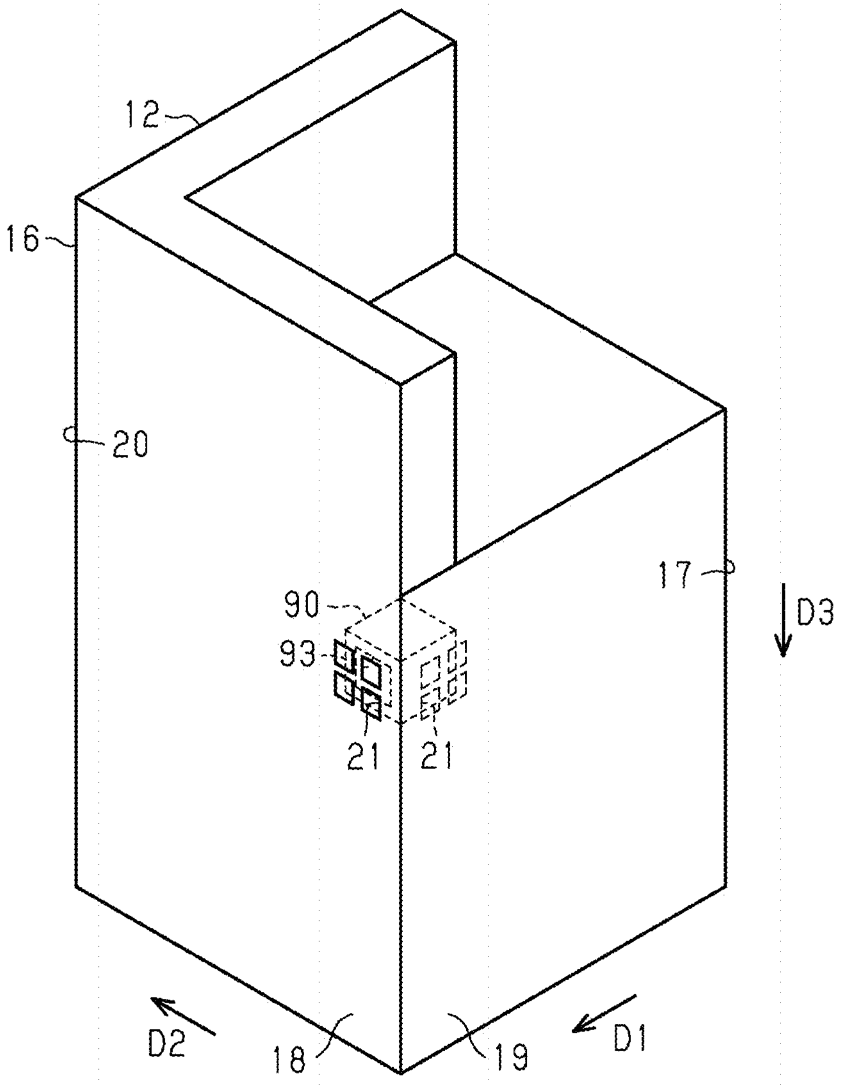
FIG. 3 is a perspective view schematically showing the recording device viewed from an angle different from that of FIG. 1.

As shown in FIGS. 2 and 3, the device main body 12 has a housing 16. The housing 16 accommodates various components of the device main body 12. The housing 16 has a rectangular parallelepiped shape. The housing 16 has a depth, a width, and a height. The depth of the housing 16 is a length of the housing 16 in a first direction D1. The width of the housing 16 is a length of the housing 16 in a second direction D2. The height of the housing 16 is a length of the housing 16 in the vertical direction D3. The first direction D1 is different from the second direction D2 and the vertical direction D3. The first direction D1 is a direction that goes from the front side of the housing 16 to the rear side of the housing 16. The second direction D2 is different from the vertical direction D3. The second direction D2 is a direction that goes from left side to right side when the housing 16 is viewed from the first direction D1. The first direction D1 and the second direction D2 indicate directions in which the installation surface where the device main body 12 is installed extends.

The housing 16 has a plurality of surfaces. The housing 16 has a front surface 17, a rear surface 18, and two side surfaces. Specifically, the housing 16 has the front surface 17, the rear surface 18, a first side surface 19, and a second side surface 20. The front surface 17 faces in a direction opposite to the first direction D1. In one example, the front surface 17 faces in the same direction as the operation section 15. The front surface 17 is a surface that faces the user operating the recording device 11. The rear surface 18 is a surface opposite to the front surface 17. The rear surface 18 faces the first direction D1. The front surface 17 and the rear surface 18 extend in the second direction D2 and the vertical direction D3. The first side surface 19 faces in a direction opposite to the second direction D2. The first side surface 19 faces in a different direction from the front surface 17, the rear surface 18, and the second side surface 20. The second side surface 20 faces opposite to the first side surface 19. The second side surface 20 faces the second direction D2. The first side surface 19 and the second side surface 20 extend in the first direction D1 and the vertical direction D3.

One or more through holes 21 may be formed in the housing 16. The through holes 21 are open on one surface of the housing 16. In one example, the through holes 21 are open on the rear surface 18. The through holes 21 may be opened to the first side surface 19 as shown by a broken line in FIG. 3. The through holes 21 allow inside and outside of the housing 16 to communicate with each other. Through the through holes 21, air flows into the housing 16 from the outside of the housing 16 or flows out from the inside of the housing 16 to the outside of the housing 16.

The housing 16 may have one or more covers. In one example, the housing 16 has a protective cover 22. The protective cover 22 is a cover for protecting a substrate unit (to be described later). In one example, the protective cover 22 protects the first substrate unit 83 (to be described later). The protective cover 22 constitutes, for example, a part of the rear surface 18 and the first side surface 19.

The protective cover 22 is configured to be openable and closable. When the protective cover 22 is opened, the inside of the housing 16 is exposed. When the protective cover 22 is opened, the substrate unit is exposed. The through holes 21 may be opened in the protective cover 22. In this case, air flows into the inside of the protective cover 22 from the outside of the housing 16 or flows out from the inside of the protective cover 22 to the outside of the housing 16 through the through holes 21.

The housing 16 may have a storage cover 23. The storage cover 23 is a cover for protecting the storage section 76 (to be described later). In one example, the storage cover 23 constitutes the front surface 17. The storage cover 23 is configured to be openable and closable. When the storage cover 23 is opened, the inside of the housing 16 is exposed. Specifically, when the storage cover 23 is opened, the storage section 76 is exposed.

Figure 4:
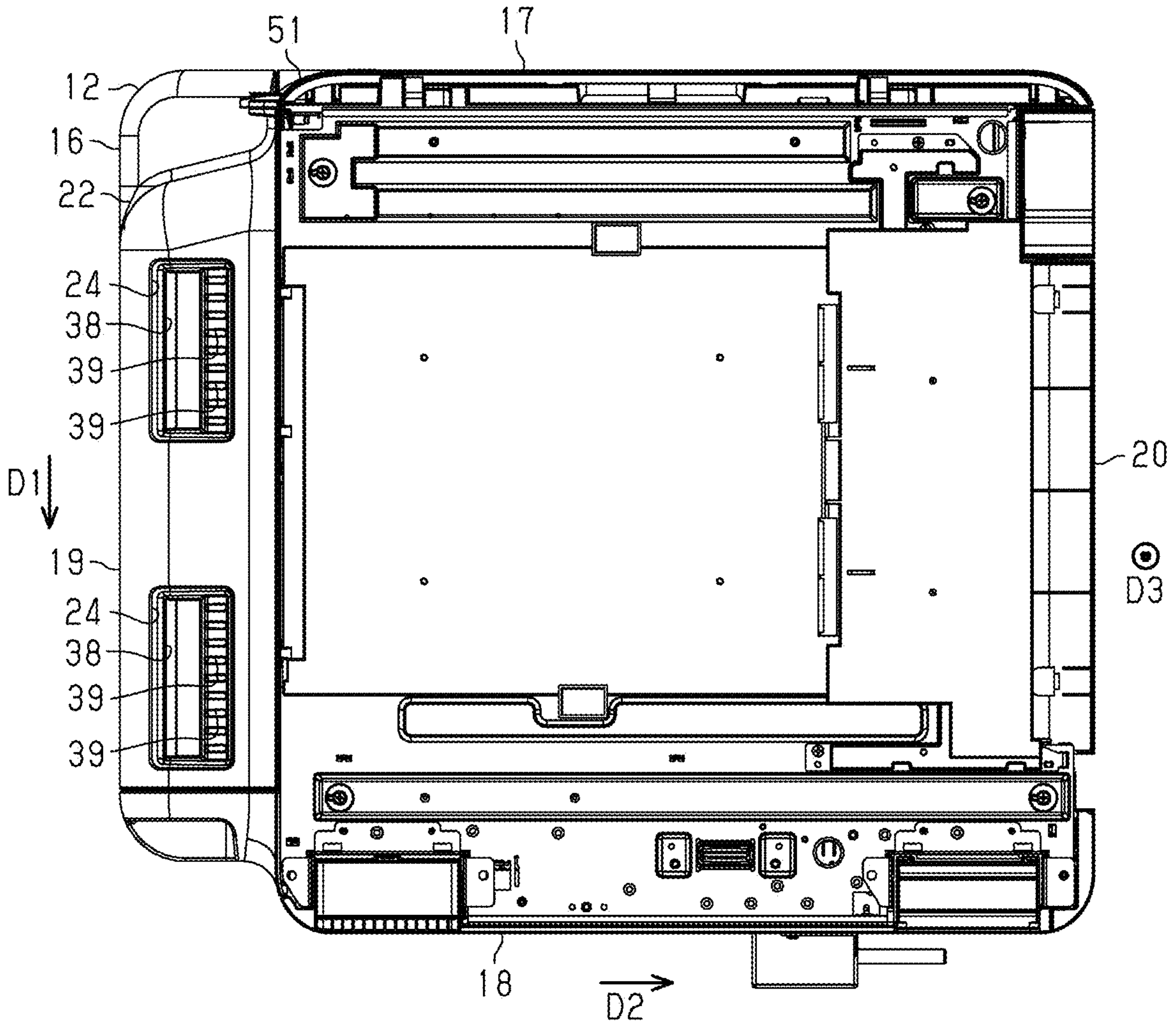
FIG. 4 is a bottom view of the recording device.

As shown in FIG. 4, one or more housing openings 24 may be formed in the housing 16. In one example, two housing openings 24 are formed in the protective cover 22. Two housing openings 24 are arranged in the first direction D1. The housing openings 24 expose the inside of the housing 16. In one example, the housing openings 24 expose the inside of the protective cover 22. Specifically, the housing openings 24 expose handhold portions 38 located in the protective cover 22. The handhold portions 38 will be described later. The inside and outside of the housing 16 communicate with each other through the housing openings 24. Air flows in and out of the housing 16 through the housing openings 24. Through the housing openings 24, air flows into the inside of the housing 16 from the outside of the housing 16, or air flows from the inside of the housing 16 to the outside of the housing 16. Specifically, through the housing openings 24, air flows into the protective cover 22 from the outside of the housing 16 or air flows out of the protective cover 22 to the outside of the housing 16.

Figure 5:
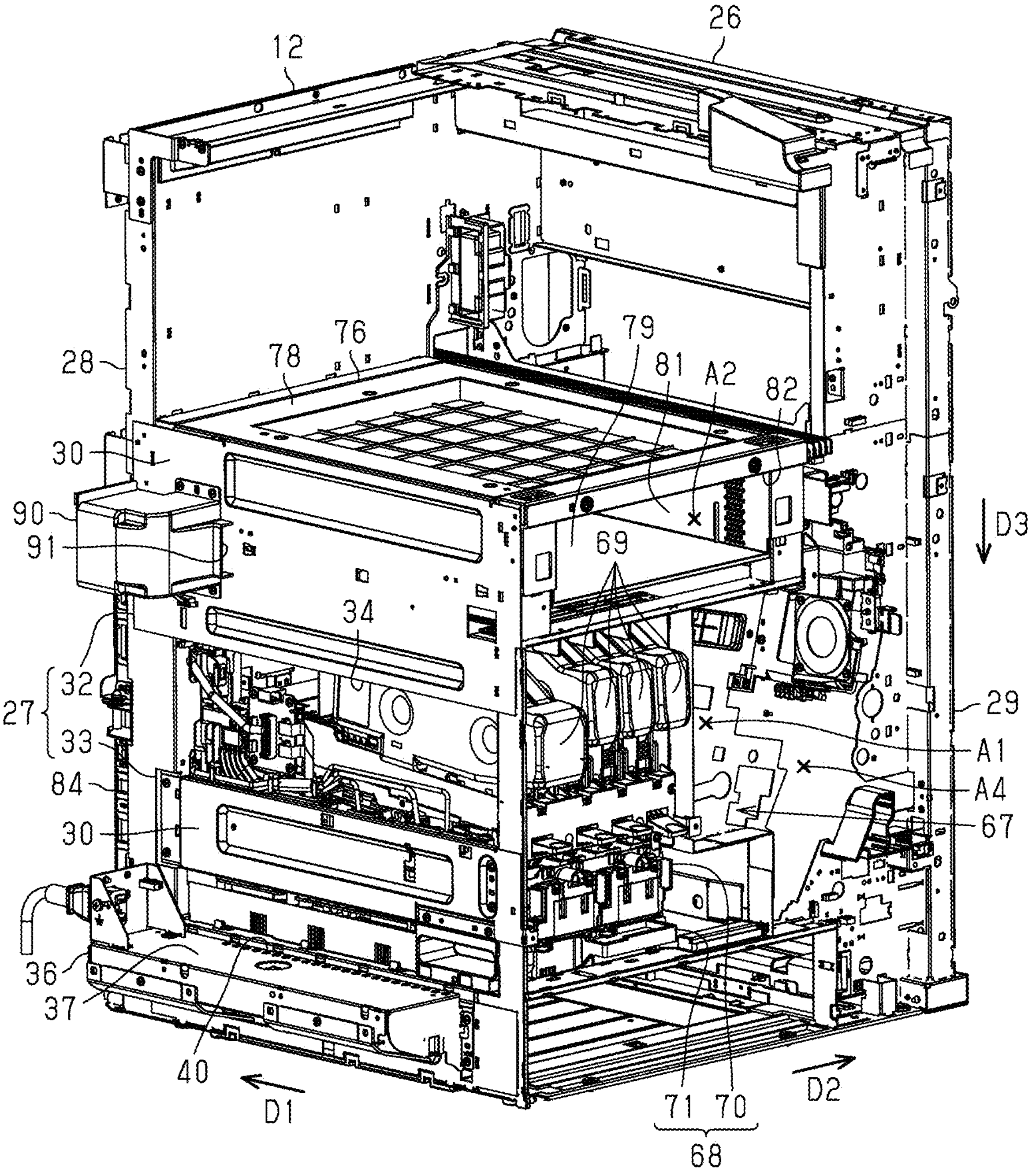
FIG. 5 is a perspective view of a device main body.
Figure 6:
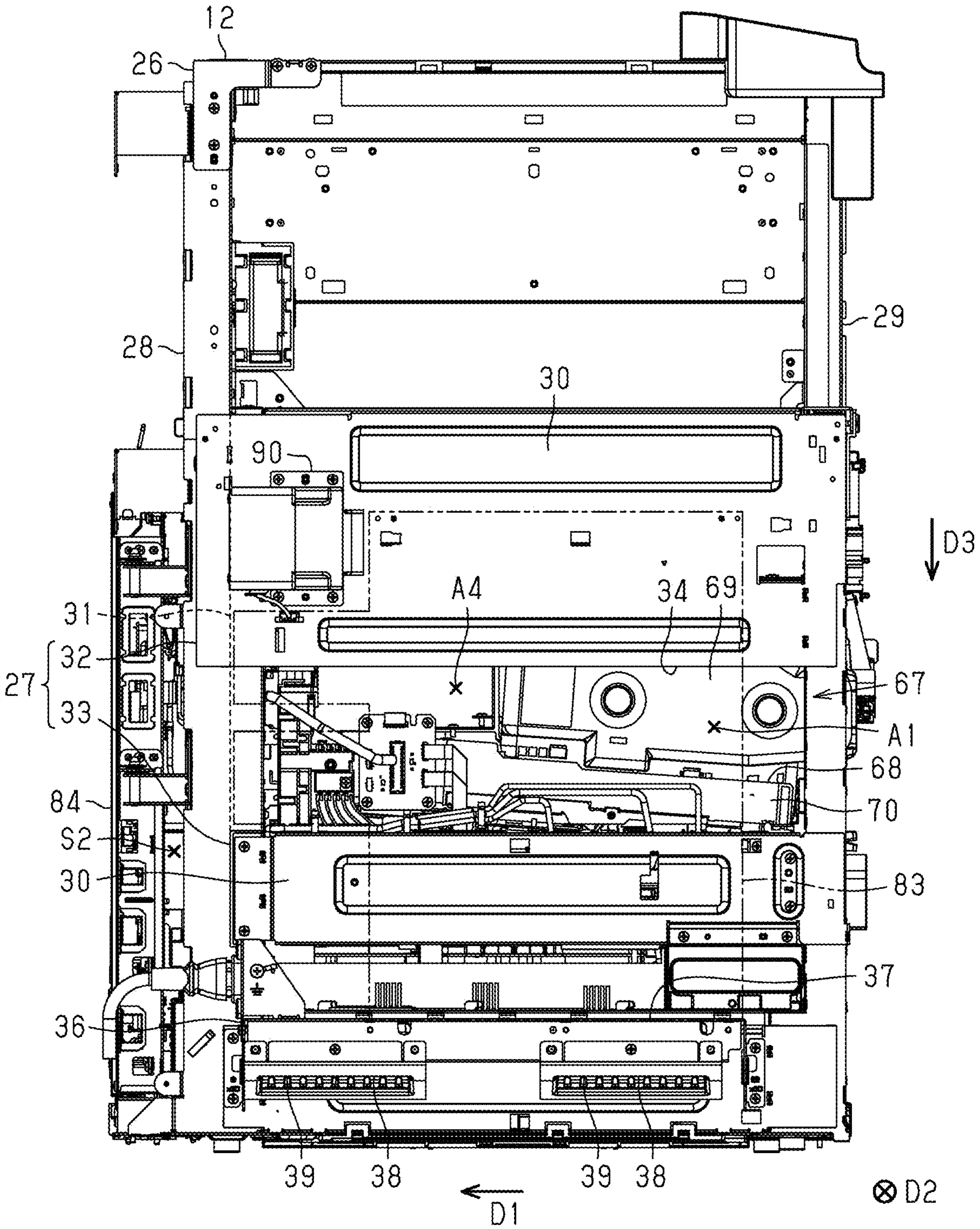
FIG. 6 is a side view of the device main body shown in FIG. 5.

As shown in FIGS. 5 and 6, the device main body 12 has a frame section 26. The frame section 26 is housed in the housing 16. The frame section 26 supports the process section 13. The frame section 26 supports the reading section 14. The frame section 26 supports the operation section 15. The frame section 26 supports the housing 16. The frame section 26 defines a frame space A1. The frame space A1 is a space surrounded by the frame section 26. In other words, the frame space A1 is a space within the frame section 26. The frame space A1 is a space in the housing 16. Various components of the device main body 12 are located in the frame space A1. The frame section 26 supports various components housed in the housing 16.

The frame section 26 has one or more frames. In one example, the frame section 26 has a first frame 27, a second frame 28, and a third frame 29. The first frame 27, the second frame 28, and the third frame 29 define the frame space A1. The frame is made of, for example, metal. By this, the rigidity of the device main body 12 is secured.

The first frame 27 is attached to the second frame 28 and the third frame 29. The first frame 27 connects the second frame 28 and the third frame 29. The first frame 27 is located on a side direction of the device main body 12. The first frame 27 is, for example, a side frame. The second frame 28 and the third frame 29 are aligned in one direction. In one example, the second frame 28 and the third frame 29 are aligned in the first direction D1. The second frame 28 is located at the rear side of the device main body 12. The second frame 28 is, for example, a rear frame. The second frame 28 is located in the first direction D1 more than the first frame 27. The third frame 29 is located on the front side of the device main body 12. The third frame 29 is, for example, a front frame.

The frame has a facing surface. In one example, the first frame 27 and the second frame 28 have facing surfaces. Specifically, the first frame 27 has a first facing surface 30. The second frame 28 has a second facing surface 31. The facing surface is a surface facing the substrate unit. The first facing surface 30 is a surface that faces the first substrate unit 83. The second facing surface 31 is a surface that faces the second substrate unit 84 (to be described later).

The facing surfaces extend in one direction and in the vertical direction D3. In one example, the first facing surface 30 extends in the first direction D1 and the vertical direction D3. The second facing surface 31 extends in the second direction D2 and the vertical direction D3. The first facing surface 30 faces in a direction opposite to the second direction D2. The first facing surface 30 faces toward the side. The first facing surface 30 extends along the first side surface 19. The second facing surface 31 faces the first direction D1. The second facing surface 31 faces the rear side. The second facing surface 31 extends along the rear surface 18.

The frame is located between the substrate unit and the supply section 67 (to be described later). Specifically, the first frame 27 is located between the first substrate unit 83 and the supply section 67. In other words, the first frame 27 is located between the first substrate unit 83 and the supply section 67 in the second direction D2. The first frame 27 is located between the first substrate unit 83 and the supply section 67 when viewed in the first direction D1. The second frame 28 is located between the second substrate unit 84 and the supply section 67. In other words, the second frame 28 is located between the second substrate unit 84 and the supply section 67 in the first direction D1. The second frame 28 is located between the second substrate unit 84 and the supply section 67 when viewed in the second direction D2.

The first frame 27 has a plurality of frame members. In one example, the first frame 27 has a first frame member 32 and a second frame member 33. The first frame member 32 and the second frame member 33 have facing surfaces. In other words, the first frame member 32 and the second frame member 33 have first facing surfaces 30. The frame member connects the second frame 28 and the third frame 29. The frame member extends in the first direction D1. The frame member is a plate extending in the first direction D1 and in the vertical direction D3.

The plurality of frame members are located so as to be separated from each other in the vertical direction D3. The first frame member 32 and the second frame member 33 are located at an interval in the vertical direction D3. The first frame member 32 and the second frame member 33 are located so as to provide a gap in the vertical direction D3. The first frame member 32 is located above the second frame member 33. In other words, the second frame member 33 is located in the vertical direction D3 more than the first frame member 32. Therefore, in the frame section 26, the exposure opening 34 is formed between the first frame member 32 and the second frame member 33. The exposure opening 34 is a gap between the frame members. The exposure opening 34 exposes the inside of the frame section 26. The exposure opening 34 exposes the frame space A1. A service person or a user can access the frame space A1 through the exposure opening 34. Specifically, a service person or a user can access the supply section 67 through the exposure opening 34.

The frame members are attached to the second frame 28 and the third frame 29. In one example, the first frame member 32 is welded to the second frame 28 and the third frame 29. By this, the rigidity of the frame section 26 is improved. On the other hand, the second frame member 33 is screwed to the second frame 28 and the third frame 29. Therefore, the second frame member 33 is detachably attached to the second frame 28 and the third frame 29. When the second frame member 33 is removed, a service person or a user can easily access the inside of the frame section 26 through the exposure opening 34. By this, a maintainability of the device main body 12 improves. The first frame member 32 may be screwed to the second frame 28 and the third frame 29, or the second frame member 33 may be welded to the second frame 28 and the third frame 29. Both the first frame member 32 and the second frame member 33 may be welded or screwed to the second frame 28 and the third frame 29.

Figure 7:
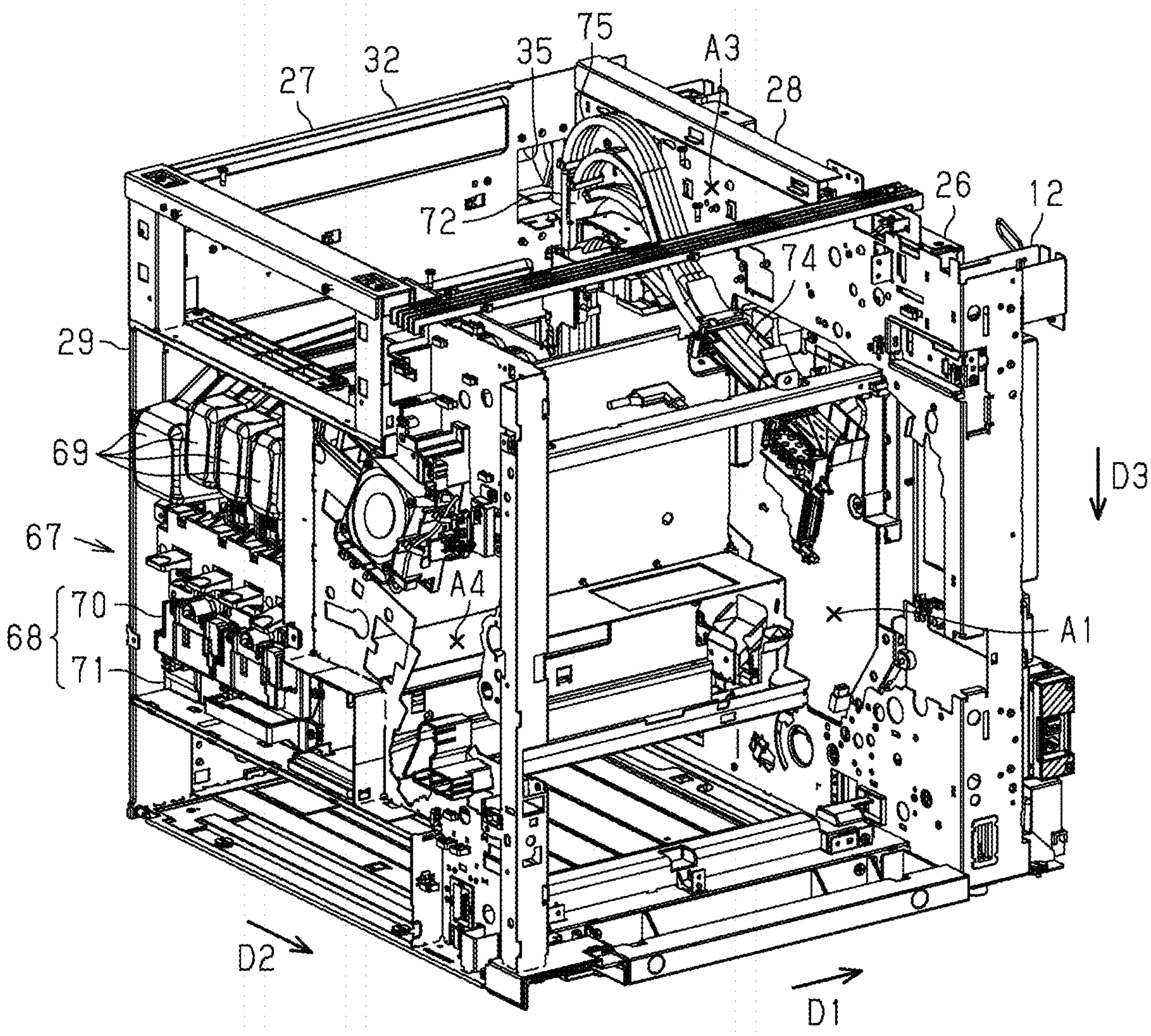
FIG. 7 is a perspective view of the device main body with the storage section removed, as viewed from an angle different from that of FIG. 5.

As shown in FIG. 7, a frame opening 35 is formed in the first frame 27. Specifically, the frame opening 35 is formed in the first frame member 32. The frame opening 35 is open in the first facing surface 30. The inner side and outer side of the frame section 26 are communicated through the frame opening 35. In other words, the frame space A1 communicates with the outside of the frame space A1 through the frame opening 35. Air flows in and out of the frame section 26 through the frame opening 35. In other words, air flows into the frame section 26 from the outside of the frame section 26 or flows out from the inside of the frame section 26 to outside of the frame section 26 through the frame opening 35. The inside of the frame section 26 communicates with the outside of the housing 16 through the through holes 21, the housing openings 24, and the frame opening 35. In other words, air flows into the frame section 26 from the outside of the housing 16 or flows out from the inside of the frame section 26 to the outside of the housing 16 through the through holes 21, the housing openings 24, and the frame opening 35.

As shown in FIGS. 5 and 6, the frame section 26 has a support frame 36. The support frame 36 is a frame that supports the substrate unit. Specifically, the support frame 36 supports the first substrate unit 83. The support frame 36 supports the first substrate unit 83 from below. The support frame 36 receives the load of the first substrate unit 83. The support frame 36 has a support surface 37. The support surface 37 is a surface that contacts the first substrate unit 83. The support surface 37 faces upward.

The support frame 36 connects the second frame 28 and the third frame 29. The support frame 36 is attached to the second frame 28 and the third frame 29. The support frame 36 is located below the first frame 27. The support frame 36 is located outside the frame space A1. The support frame 36 is protected by a protective cover 22.

As shown in FIGS. 4 and 6, the frame section 26 has one or more handhold portions 38. In one example, the frame section 26 has two handhold portions 38. The two handhold portions 38 are aligned in the first direction D1. The handhold portions 38 are attached to the support frame 36. The handhold portions 38 are located at the lower portion of the support frame 36. The handhold portions 38 have recesses that are recessed toward the inside of the housing 16. These recesses are recessed toward the upper side of the housing 16. The handhold portions 38 are located so as to close the housing openings 24. When transporting the recording device 11, a service person or a user hang their hands on the handhold portions 38.

The handhold portions 38 are not limited to the configuration of being attached to the support frame 36. For example, the handhold portions 38 may be provided on the housing 16, such as the protective cover 22. Specifically, the handhold portions 38 may be attached to the protective cover 22 at positions corresponding to the housing openings 24. With such a configuration, the housing openings 24 expose the inside of the housing 16 and the inside of the protective cover 22 through the handhold portions 38.

One or more ventilation openings 39 are formed in the handhold portions 38. Specifically, the ventilation openings 39 are open to the handhold portions 38. The inside and outside of the housing 16 communicate with each other through the housing openings 24 and the ventilation openings 39. Air flows in and out of the housing 16 through the housing openings 24 and the ventilation openings 39. Through the housing openings 24 and the ventilation openings 39, air flows into the housing 16 from the outside of the housing 16, or air flows from the inside of the housing 16 to the outside of the housing 16. The ventilation openings 39 are not limited to the handhold portions 38, and may be open to the rear surface 18.

Figure 8:
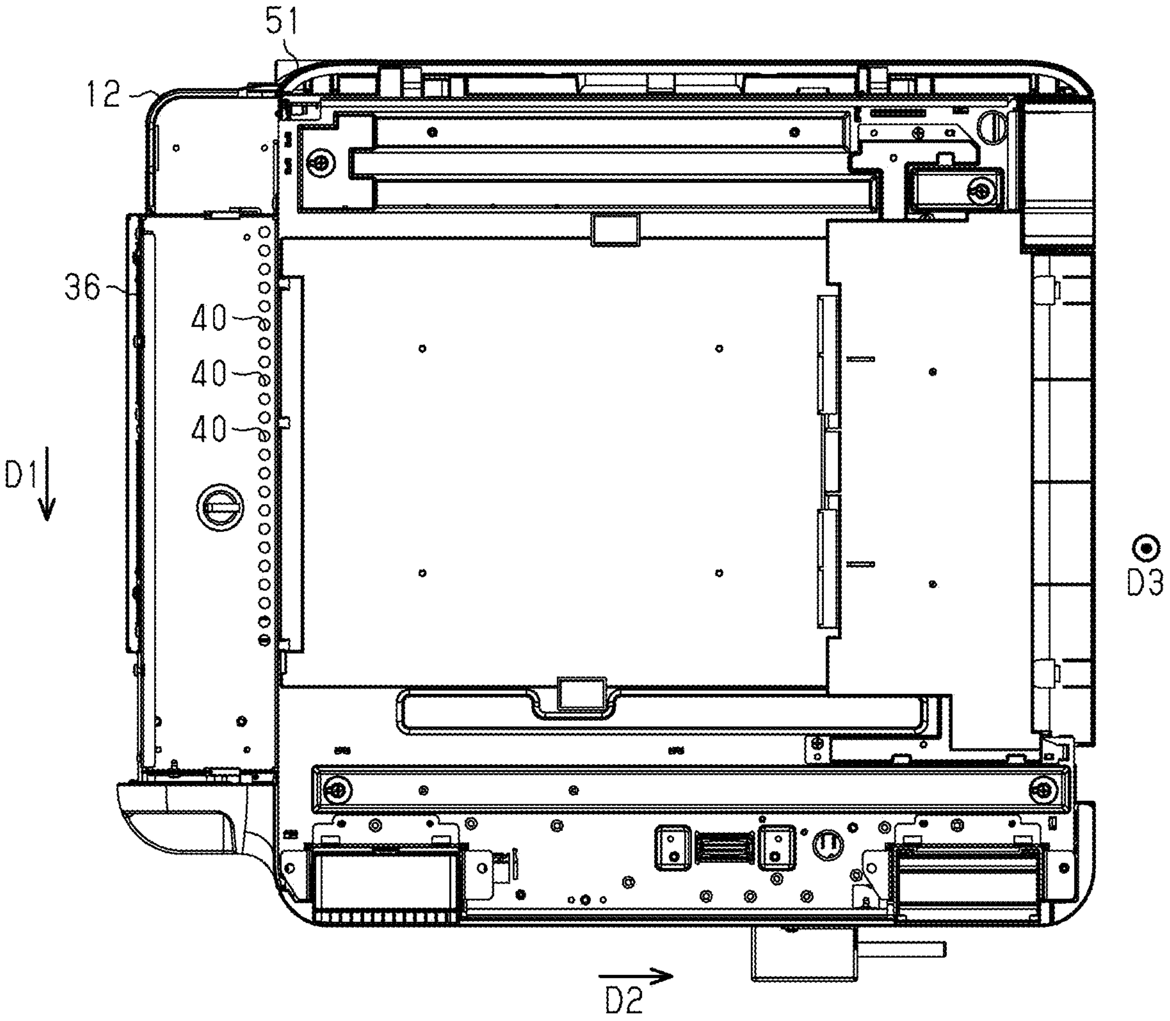
FIG. 8 is a bottom view of the device main body.

As shown in FIG. 8, one or more continuous openings 40 are formed in the support frame 36. In one example, a plurality of continuous openings 40 are formed in the support frame 36. The plurality of continuous openings 40 are arranged, for example, in the first direction D1. The continuous openings 40 are open to the support surface 37. The continuous openings 40 communicates with the ventilation openings 39. Air flows in and out of the housing 16 through the continuous openings 40 and the ventilation openings 39.

Figure 9:
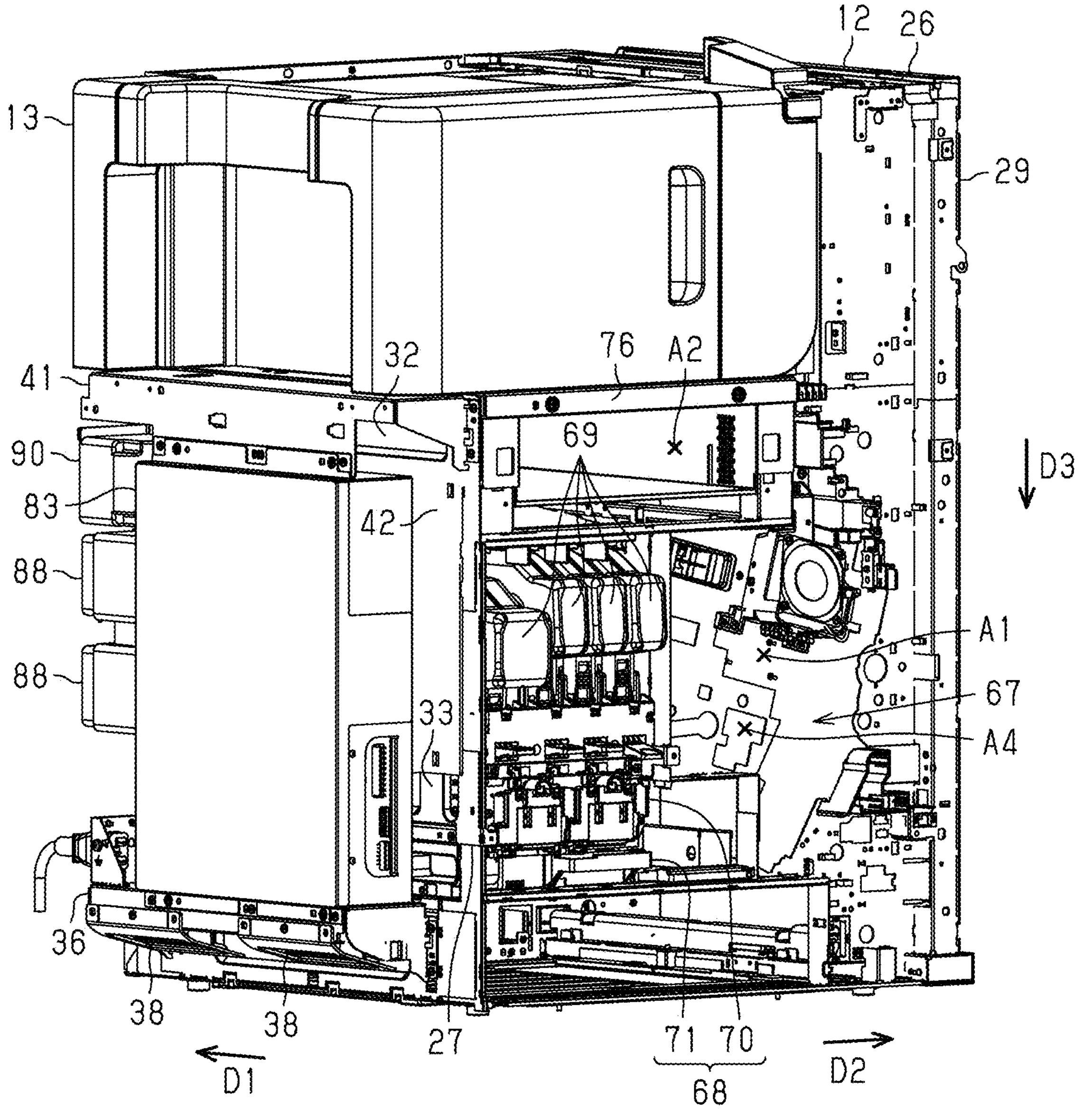
FIG. 9 is a perspective view of the device main body to which a process section and a substrate unit are attached.

As shown in FIG. 9, the frame section 26 has an attachment frame 41. The attachment frame 41 is attached to the first frame 27. Specifically, the attachment frame 41 is attached to the first frame member 32. The attachment frame 41 is attached to the substrate unit. Specifically, the attachment frame 41 is attached to the first substrate unit 83. Therefore, the first substrate unit 83 is attached to the first frame 27 through the attachment frame 41.

Figure 10:
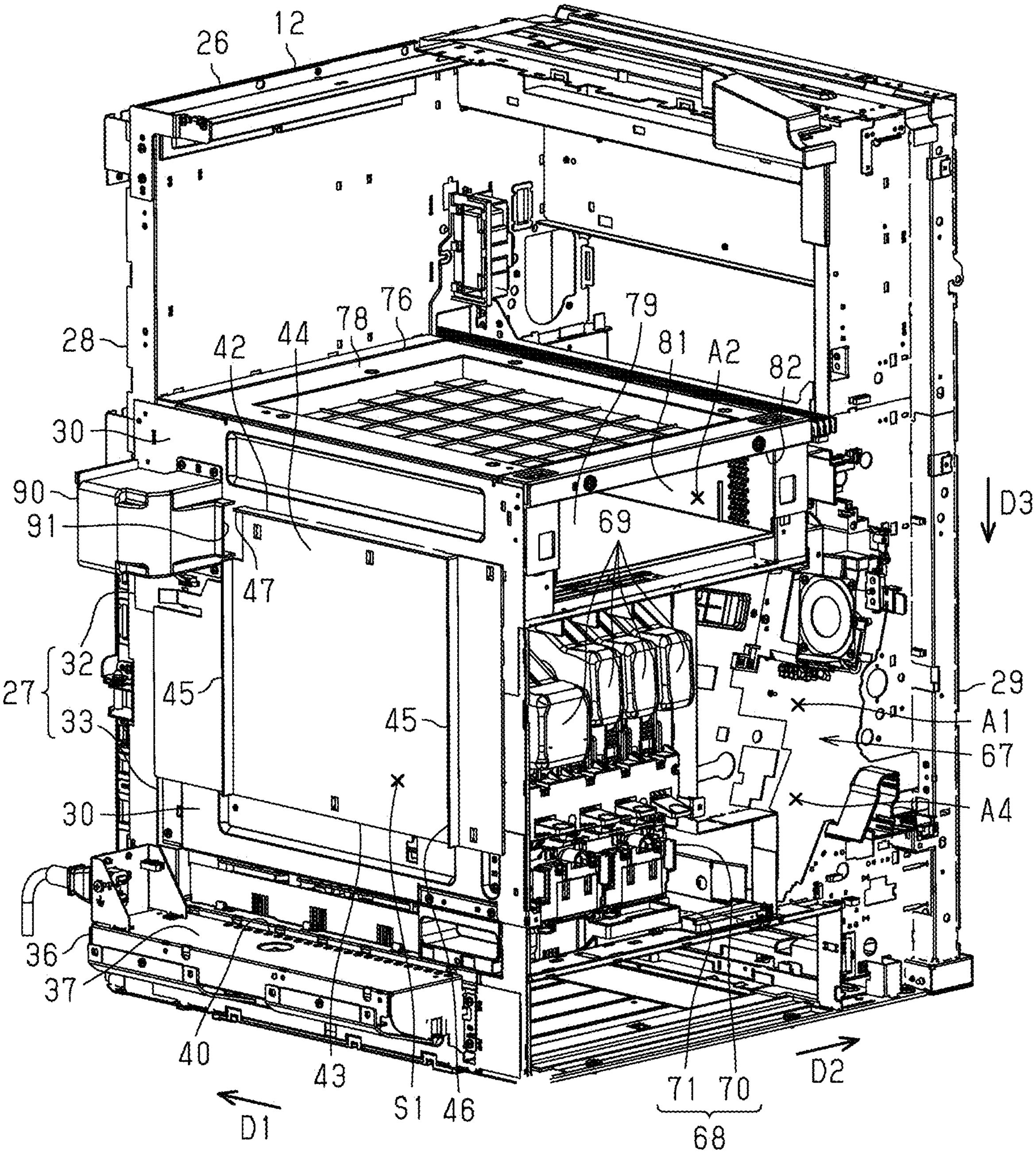
FIG. 10 is a perspective view in which a shield plate is attached to the device main body shown in FIG. 5.
Figure 11:
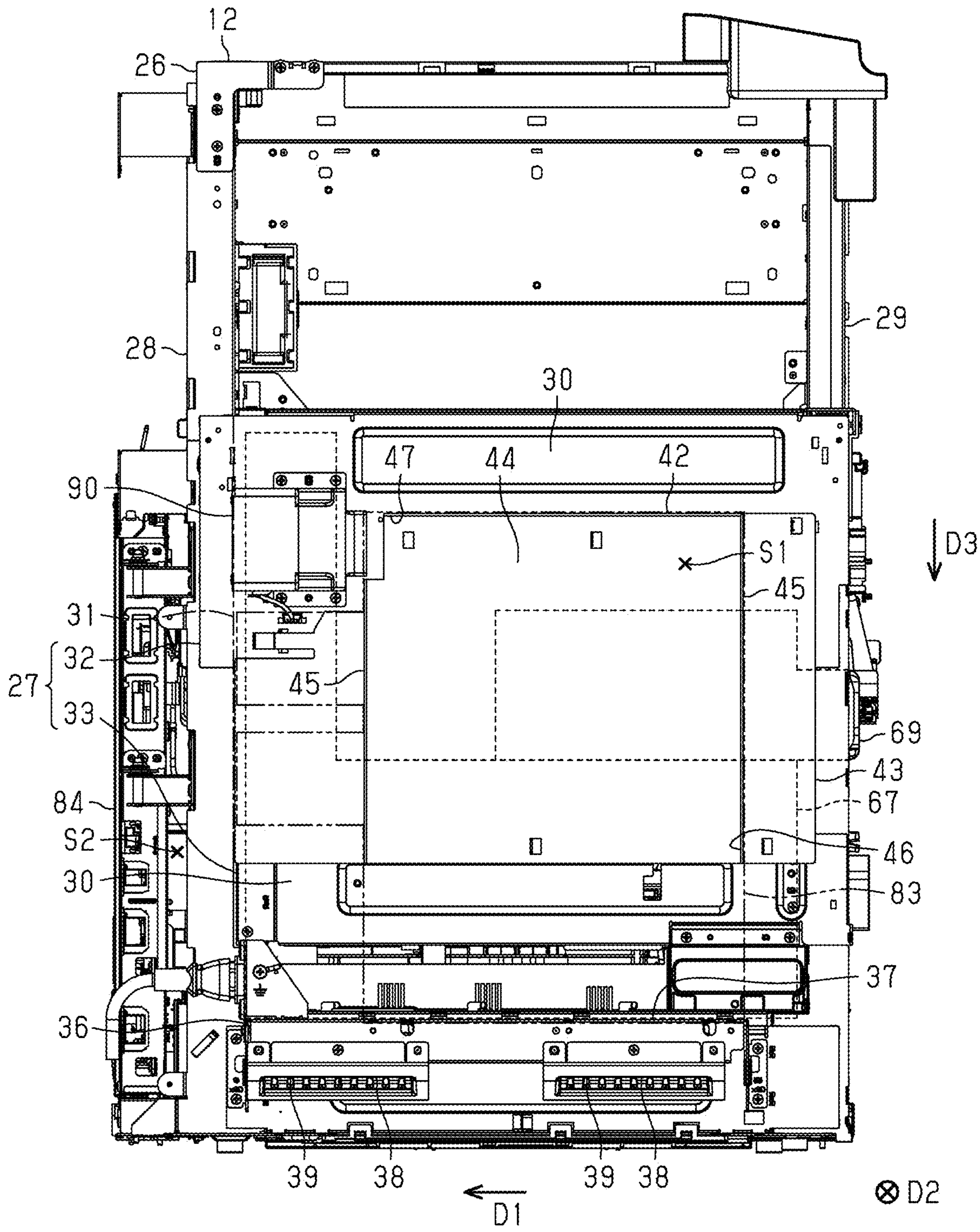
FIG. 11 is a side view of the device main body shown in FIG. 10.

As shown in FIGS. 10 and 11, the frame section 26 may have a shield plate 42. The shield plate 42 is attached to the frame. Specifically, the shield plate 42 is attached to the first frame 27. The shield plate 42 is attached to the first frame member 32 and the second frame member 33. The shield plate 42 is attached so as to cover the gap between the first frame member 32 and the second frame member 33. In other words, the shield plate 42 is attached so as to cover the exposure opening 34. The shield plate 42 is attached to the first facing surface 30. The shield plate 42 is detachably attached to the first frame 27. In one example, the shield plate 42 is screwed to the first frame 27. When the shield plate 42 is removed, the exposure opening 34 is exposed. Since the shield plate 42 is screwed to the first frame 27, it can be removed from the second frame 28 and the third frame 29 together with the second frame member 33.

The shield plate 42 is located between the substrate unit and the supply section 67. Specifically, the shield plate 42 is located between the first substrate unit 83 and the supply section 67. The shield plate 42 partitions the frame space A1 and the outside of the frame space A1 in the housing 16. The shield plate 42 overlaps with the first substrate unit 83 when the first facing surface 30 is viewed from the front side, that is, when viewed from the second direction D2. The shield plate 42 overlaps the supply section 67 when viewed in the second direction D2. As an example, when the shield plate 42 is viewed in the second direction D2, the shield plate 42 overlaps with a container 69 (to be described later).

The shield plate 42 shields the substrate unit from heat. The shield plate 42 shields the first substrate unit 83 from heat. Therefore, it is preferable that the shield plate 42 is made of a material with low thermal conductivity. In one example, the shield plate 42 is made of a resin material. In this case, the degree of freedom of the shape of the shield plate 42 is improved as compared with the case where the shield plate 42 is made of metal.

The shield plate 42 may be composed of a frame member. The shield plate 42 may be composed of the first frame member 32 or the second frame member 33. In this case, the first frame member 32 and the second frame member 33 are attached to the second frame 28 and the third frame 29 without forming the exposure opening 34. In this case, the shield plate 42 is made of metal.

Figure 12:
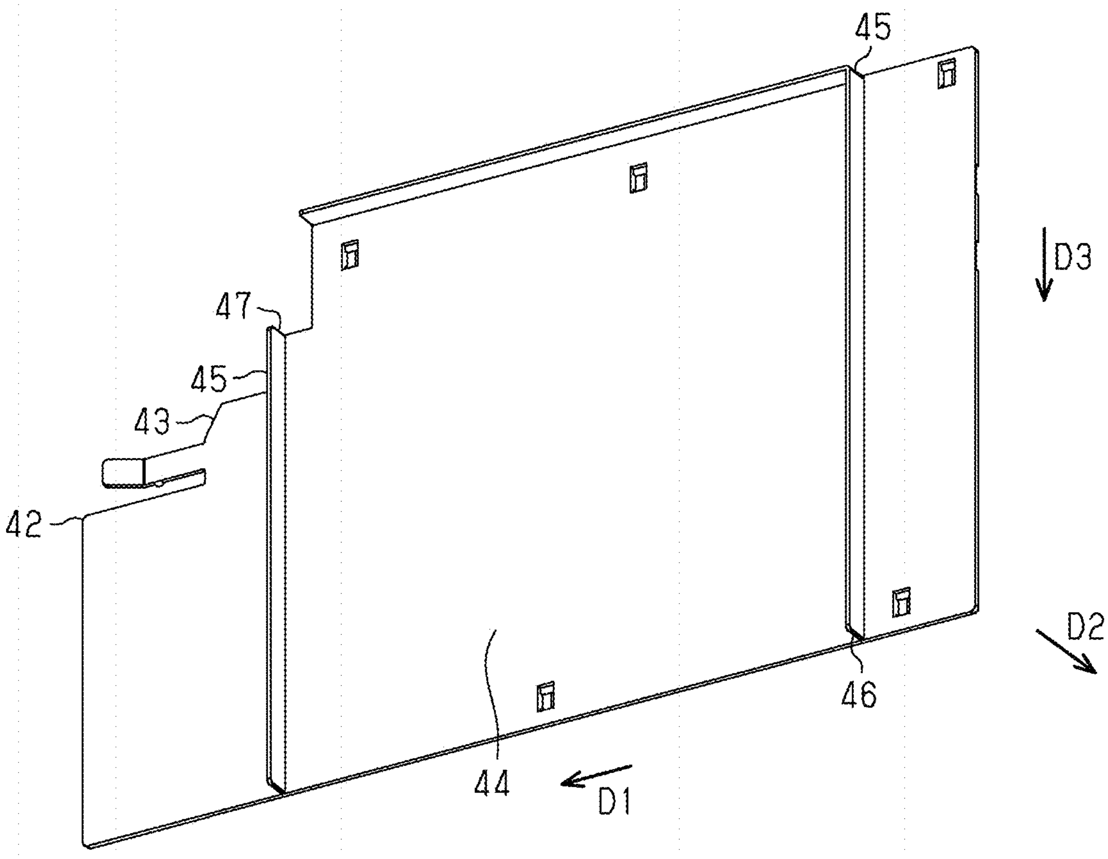
FIG. 12 is a perspective view of the shield plate.

As shown in FIGS. 10, 11, and 12, the shield plate 42 has a plate portion 43. The plate portion 43 extends in the first direction D1 and the vertical direction D3. The plate portion 43 is attached to the first frame 27. The plate portion 43 has a shield surface 44. The shield surface 44 is a surface facing the substrate unit. Specifically, the shield surface 44 faces the first substrate unit 83. The shield surface 44 faces the direction opposite to the second direction D2.

The shield plate 42 may have one or more partition ribs 45. In one example, the shield plate 42 has two partition ribs 45. The partition ribs 45 extend from the plate portion 43. The partition ribs 45 extend perpendicularly from the shield surface 44. In other words, the partition ribs 45 extend from the plate portion 43 in a direction opposite to the second direction D2.

The partition ribs 45 extend in a portion of the shield surface 44 that faces the first substrate unit 83. In one example, the partition ribs 45 extend along the edge portions of the first substrate unit 83 when viewed in the second direction D2. The partition ribs 45 partition a flow space (to be described later) and the outside of the flow space in the housing 16. More specifically, the partition ribs 45 separates the first flow space S1 (to be described later) from the outside of the first flow space S1 in the housing 16. The partition ribs 45 guide air flowing in the first flow space S1.

Two flow openings are formed in the shield plate 42. Specifically, the first flow opening 46 and the second flow opening 47 are formed in the shield plate 42. The flow opening is an opening through which air enters to and exits from the flow space. The flow opening is formed by the plate portion 43 and the two partition ribs 45. The first flow opening 46 is located in the vertical direction D3 from the second flow opening 47. The first flow opening 46 faces in the vertical direction D3. The second flow opening 47 faces the first direction D1. On the shield plate 42, air flows from the first flow opening 46 to the second flow opening 47 or from the second flow opening 47 to the first flow opening 46 by the two partition ribs 45.

Figure 13:
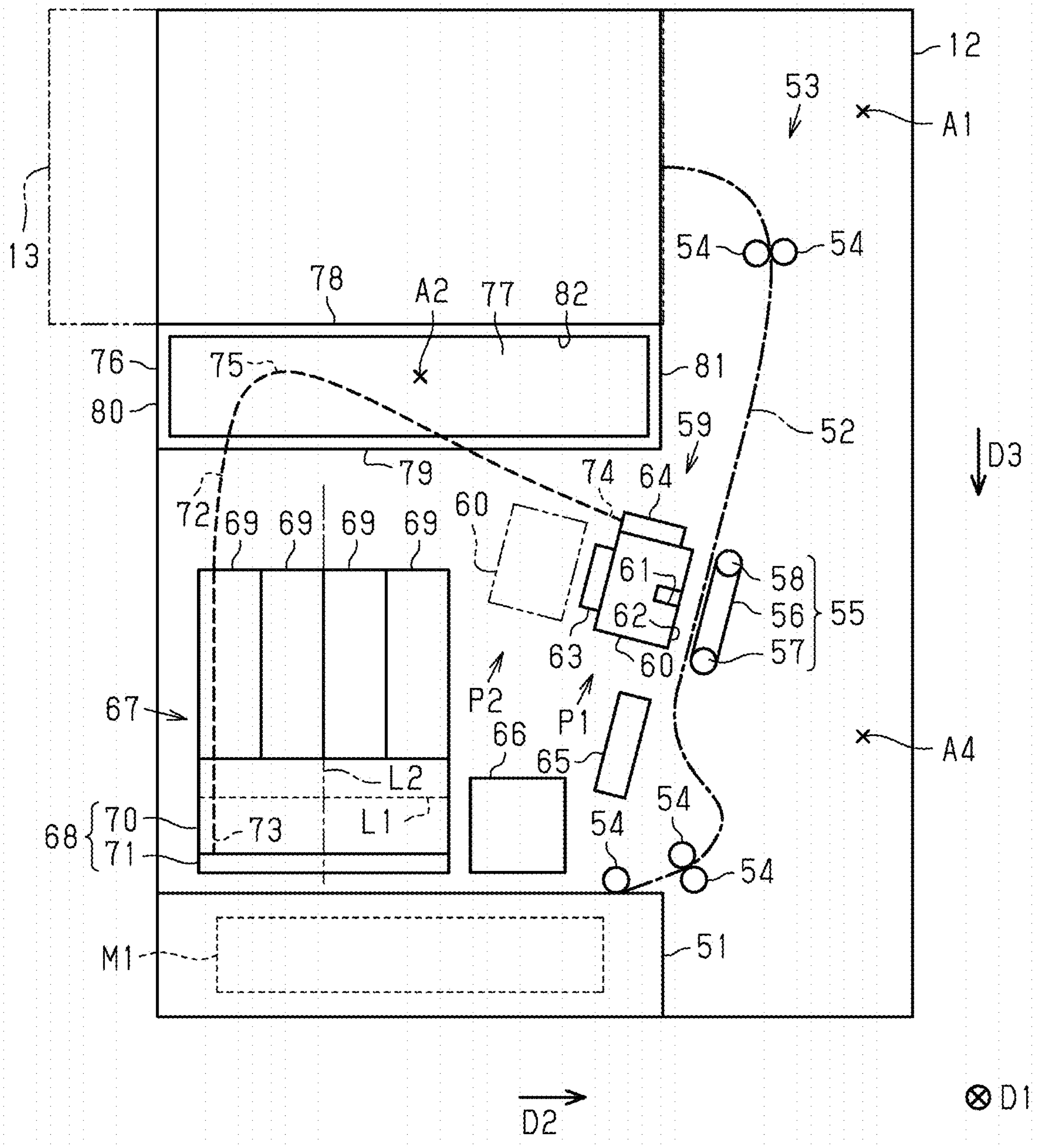
FIG. 13 is a front view showing an internal configuration of the recording device.

As shown in FIG. 13, the device main body 12 has an accommodation section 51. The accommodation section 51 is configured to store medium M1. The accommodation section 51 stores, for example, a plurality of medium M1 in a stacked state. The accommodation section 51 is attached to the housing 16. The accommodation section 51 is located at a lower portion in the housing 16. In one example, the accommodation section 51 is configured to be insertable into and removable from the housing 16. The accommodation section 51 is, for example, a cassette. The accommodation section 51 can be inserted and removed from the front surface 17, for example. The user can pull out the accommodation section 51 from the housing 16 to refill the accommodation section 51 with the medium M1. The accommodation section 51 is not limited to a cassette, and may be a tray.

The device main body 12 has a transport path 52. The transport path 52 is a path along which the medium M1 is transported. The transport path 52 extends within the housing 16. The transport path 52 extends from the inside of the housing 16 toward the outside of the housing 16. Specifically, the transport path 52 extends from the accommodation section 51 toward the process section 13. Image is recorded on the medium M1 in the process of being transported along the transport path 52.

The device main body 12 has a transport section 53. The transport section 53 is configured to transport the medium M1. The transport section 53 transports the medium M1 stored in the accommodation section 51. The transport section 53 transports the medium M1 along the transport path 52. The transport section 53 has one or more rollers 54. In one example, the transport section 53 has a plurality of rollers 54. A plurality of rollers 54 are located along the transport path 52. The plurality of rollers 54 rotate to transport the medium M1.

The device main body 12 has a support section 55. The support section 55 is configured to support the medium M1. The support section 55 supports the medium M1 being transported from the accommodation section 51. The support section 55 supports the medium M1 being transported along the transport path 52. In one example, the support section 55 supports the medium M1 in a posture that inclines with respect to the horizontal direction. The support section 55 supports the medium M1 by sucking the medium M1. By this, the posture of the medium M1 is stabilized. The support section 55 may support the medium M1 in a horizontal posture.

The support section 55 may be configured to transport the medium M1. In one example, the support section 55 has a transport belt 56, a first pulley 57, and a second pulley 58. The transport belt 56 is wound around the first pulley 57 and the second pulley 58. The transport belt 56 attracts the medium M1, for example, by electrostatic force. By this, the transport belt 56 supports the medium M1. The transport belt 56 may be configured to suck the medium M1 by, for example, a negative pressure due to suction. As the first pulley 57 and the second pulley 58 rotate, the transport belt 56 rotates. As a result, the medium M1 supported by the transport belt 56 is transported. The transport belt 56 transports the medium M1, for example, obliquely upward.

The device main body 12 has a recording section 59. The recording section 59 is configured to record an image on the medium M1. The recording section 59 records an image on the medium M1 by ejecting liquid onto the medium M1. The recording section 59 faces the support section 55. The recording section 59 records an image on the medium M1 supported by the support section 55.

The recording section 59 extends in one direction. Specifically, the recording section 59 extends in the first direction D1. The recording section 59 includes a line head that is capable of simultaneously ejecting liquid over the entire width of the medium M1. The recording section 59 has a head 60. The head 60 has an ejection surface 62 on which one or more nozzles 61 are open. The head 60 ejects liquid from the nozzles 61. The ejection surface 62 faces the medium M1. The ejection surface 62 faces the support section 55.

The recording section 59 has a head control section 63. The head control section 63 is configured to control the head 60. The head control section 63 controls ejection of the liquid by controlling the head 60. The head control section 63 is located on the upper surface of the head 60. The upper surface of the head 60 is a surface opposite to the ejection surface 62 in the head 60. The head control section 63 is connected to a substrate unit. The head control section 63 is connected to the substrate unit by, for example, electric wires or signal lines.

The head control section 63 may be composed of one or more processors that execute various processes according to a computer program. The head control section 63 may be constituted by one or more dedicated hardware circuits such as an ASIC that executes at least a part of various processes. The head control section 63 may be constituted by a circuit including a combination of a processor and a hardware circuit. The processor includes a CPU and a memory, such as RAM and ROM. The memory stores program code or instructions configured to cause the CPU to perform the processing. The memory, that is, computer readable medium, includes any readable medium that can be accessed by a general purpose or special purpose computer.

The recording section 59 has a joint 64. The joint 64 is connected to the supply section 67. Liquid is supplied to the head 60 through the joint 64. The joint 64 is located on an upper side of the head 60. In one example, the joint 64 is located on a side surface of the head 60. Specifically, the joint 64 is located on a side surface facing upward among a plurality of side surfaces of the head 60.

The recording section 59 is configured to move to a recording position P1 and to a retreat position P2. The recording section 59 is displaced to the recording position P1 and the retreat position P2 by moving in a direction perpendicular to the ejection surface 62. The recording section 59 is displaced by a mechanism such as a rack and pinion, a ball screw, or the like.

The recording position P1 is a position at which the recording section 59 records on the medium M1. In other words, the recording position P1 is a position where an image is recorded on the medium M1, which is supported by the support section 55. The recording position P1 is the position of the recording section 59 that is indicated by a solid line in FIG. 13. At the recording position P1, the recording section 59 approaches the support section 55.

The retreat position P2 is a position where the recording section 59 retreats from the support section 55. In other words, the retreat position P2 is a position that is farther from the medium M1, which is supported by the support section 55, than the recording position P1. Therefore, the distance between the recording section 59 located at the retreat position P2 and the support section 55 is larger than the distance between the recording section 59 located at the recording position P1 and the support section 55. The retreat position P2 is the position of the recording section 59 that is indicated by a two-dot chain line in FIG. 13.

The recording section 59 overlaps the support section 55 when viewed from the second direction D2. Specifically, the head 60 overlaps the transport belt 56 when viewed from the second direction D2. As an example, when viewed from the second direction D2, the head 60 located at the recording position P1 overlaps the transport belt 56. When viewed from the second direction D2, the head 60 located at the retreat position P2 overlaps the transport belt 56.

The device main body 12 has a maintenance section 65. The maintenance section 65 is configured to maintain the recording section 59. The maintenance section 65 performs maintenance of the head 60. Specifically, the maintenance section 65 performs maintenance of the head 60 by flushing, capping, cleaning, or the like. The flushing is an operation in which the head 60 appropriately ejects liquid from the nozzles 61. The flushing can suppress clogging of the nozzles 61. The maintenance section 65 receives the liquid by flushing. The capping is an operation for retaining moisture in the nozzles 61. The capping can suppress clogging of the nozzles 61. The maintenance section 65 forms a space that communicates with the nozzles 61 by contacting the head 60. The cleaning is an operation that causes liquid to eject from the nozzles 61. By the cleaning, the foreign matter is ejected from the head 60 together with the liquid. The maintenance section 65 causes liquid to eject from the nozzles 61 by sucking.

The maintenance section 65 is configured to be displaceable. The maintenance section 65 is displaced by, for example, a rack and pinion, a ball screw, or the like. The maintenance section 65 is located at a maintenance position when the recording section 59 is to be maintained. The maintenance position is a position between the support section 55 and the recording section 59. At the maintenance position, the maintenance section 65 faces the ejection surface 62. When the recording section 59 is not to be maintained, the maintenance section 65 is located at a standby position. The standby position is a position retreated from the position between the support section 55 and the recording section 59. The maintenance section 65 shown in FIG. 13 is located at the standby position.

A waste liquid tank 66 may be attached to the device main body 12. The waste liquid tank 66 is a tank that stores liquid that was discharged by maintenance. The waste liquid tank 66 is connected to the maintenance section 65. The waste liquid tank 66 stores the liquid received by the maintenance section 65 by flushing, cleaning, or the like. In one example, the waste liquid tank 66 is replaceable.

The waste liquid tank 66 overlaps the maintenance section 65 when viewed from the second direction D2. Specifically, the waste liquid tank 66 overlaps the maintenance section 65 located at the standby position when viewed from the second direction D2. The waste liquid tank 66 may also overlap the maintenance section 65 located at the maintenance position when viewed from the second direction D2. The waste liquid tank 66 is mounted on the device main body 12 so that the waste liquid tank 66 overlaps the maintenance section 65 when viewed from the second direction D2.

The device main body 12 has a supply section 67. The supply section 67 is configured to supply liquid to the recording section 59. The supply section 67 is connected to the recording section 59. The supply section 67 is connected to the joint 64. The supply section 67 is located between the first frame 27 and the transport section 53 when viewed in the first direction D1. In other words, in the first direction D1, a distance between the first frame 27 and the supply section 67 is smaller than a distance between the first frame 27 and the transport section 53. Thus, the transport section 53 approaches the second side surface 20, whereas the supply section 67 approaches the first side surface 19. Therefore, the supply section 67 approaches the first substrate unit 83.

The supply section 67 has a mount section 68. The mount section 68 is configured such that one or more containers 69 are attached thereon. In one example, four containers 69 are attached to the mount section 68. Specifically, the four containers 69 are attached to the mount section 68 in a state of being aligned in the second direction D2. The container 69 is configured to contain liquid. The container 69 is, for example, an ink cartridge. Each of the four containers 69 contains a different type of liquid. Each of the four containers 69 contains a different color liquid.

The containers 69 overlap the recording section 59 when viewed from the second direction D2. Specifically, the containers 69 overlap the head 60 located at the recording position P1 when viewed in the second direction D2. When viewed in the second direction D2, the containers 69 also overlap the head 60 located at the retreat position P2. The containers 69 are attached to the mount section 68 so that the containers 69 overlap the recording section 59 when viewed from the second direction D2.

The containers 69 overlap the support section 55 when viewed in the second direction D2. In other words, the containers 69 are attached to the mount section 68 so that the containers 69 overlaps the support section 55 when viewed from the second direction D2.

The mount section 68 has a storage section 70. The storage section 70 is configured so that the containers 69 are attached to it. The storage section 70 is configured to store liquid supplied from the containers 69. The storage section 70 stores a plurality of types of liquids supplied from a plurality of containers 69. The storage section 70 is located below the containers 69.

The storage section 70 stores liquid so that a liquid level is positioned at a reference position L1. The storage section 70 receives liquid from the containers 69 so that the liquid level is maintained at the reference position L1. In one example, the storage section 70 is open to the atmosphere. Liquid is automatically supplied from containers 69 to storage section 70 by the atmospheric pressure. When the liquid level of the storage section 70 falls below the reference position L1, liquid is supplied from the containers 69 to the storage section 70. When the liquid level reaches the reference position L1, the supply of the liquid from the container 69 to the storage section 70 is stopped.

The reference position L1 is positioned below the head 60. Specifically, the reference position L1 is positioned below the ejection surface 62. The storage section 70 supplies liquid according to a water head difference with the recording section 59. Therefore, when the reference position L1 is positioned below the ejection surface 62, the inside of the head 60 becomes a negative pressure. By this, a meniscus is formed in the nozzles 61. Therefore, the head 60 can appropriately eject liquid.

The mount section 68 has a relay member 71. The relay member 71 is a member for relaying the storage section 70 and the recording section 59. The relay member 71 is, for example, a flow path member in which a resin plate is attached to a groove formed resin base material. The relay member 71 is connected to the storage section 70. Liquid stored in the storage section 70 flows through the relay member 71. The relay member 71 extends below the storage section 70. The relay member 71 extends in the first direction D1. The relay member 71 extends below the storage section 70 toward the rear side of the storage section 70.

The supply section 67 has a flow path 72. Liquid flows in the flow path 72. The flow path 72 is a flexible tube. In one example, the flow path 72 is a multi-connected tube through which a plurality of types of liquids flow. The flow path 72 may be constituted by a plurality of tubes that are drawn and aligned. The flow path 72 is connected to the mount section 68 and the recording section 59. Specifically, the flow path 72 is connected to the relay member 71 and the joint 64.

The flow path 72 has a first end portion 73 and a second end portion 74. The first end portion 73 is connected to the mount section 68. Specifically, the first end portion 73 is connected to the relay member 71. The second end portion 74 is connected to the recording section 59. Specifically, the second end portion 74 is connected to the joint 64. Therefore, a distance between the first end portion 73 and the mount section 68 is smaller than a distance between the first end portion 73 and the recording section 59. A distance between the second end portion 74 and the recording section 59 is smaller than a distance between the second end portion 74 and the mount section 68.

The first end portion 73 and the second end portion 74 are located so as to sandwich the center of the mount section 68 when viewed in the first direction D1. In one example, the first end portion 73 is located in a direction opposite to the second direction D2 from a center line L2. The center line L2 is a virtual line that divides the mount section 68 in two portions in the second direction D2. The center line L2 extends in the vertical direction D3. The center line L2 is the virtual line passing through the central position of the mount section 68 in the second direction D2. The second end portion 74 is located in the second direction D2 from the center line L2. In other words, the first end portion 73 and the second end portion 74 are located so as to sandwich the center line L2 in the second direction D2. By this, the degree of bending of the flow path 72 is reduced. If both the first end portion 73 and the second end portion 74 are located in the second direction D2 side of the center line L2, the degree of bending of the flow path 72 becomes strong. In this case, the flow path 72 may be bent at an acute angle. In the case where the flow path 72 is composed of a plurality of tubes, the first end portion 73 and the second end portion 74 may be located so as to sandwich the center line L2 with respect to one or more of the plurality of tubes.

The flow path 72 has an upper section portion 75. The upper section portion 75 includes a part of the flow path 72 that includes the top portion of it. In other words, the upper section portion 75 includes a portion of the flow path 72 that is located at a vertex of it. The upper section portion 75 is a portion located between the first end portion 73 and the second end portion 74. The upper section portion 75 includes a portion that bends convexly upward. When viewed in the first direction D1, the upper section portion 75 is a portion overlapping with the storage section 76 (to be described later). The upper section portion 75 is located in a flow path space A3 (to be described later).

The flow path 72 overlaps the mount section 68 when viewed in the first direction D1. Specifically, when viewed in the first direction D1, a part of the flow path 72 including the first end portion 73 overlaps the storage section 70. The flow path 72 extends upward from the relay member 71. The flow path 72 extends straight upward in the rear side of the storage section 70. The flow path 72 extends upward from the first end portion 73 toward the second end portion 74, and then extends in the second direction D2. The flow path 72 extends along the second frame 28 from the first end portion 73 to the second end portion 74. Therefore, the flow path 72 approaches the second substrate unit 84.

The flow path 72 overlaps the containers 69 when viewed in the first direction D1. In other words, the containers 69 are attached to the mount section 68 so that the flow path 72 overlaps the containers 69 when viewed in the first direction D1. In one example, when viewed in the first direction D1, a portion of the flow path 72 between the first end portion 73 and the upper section portion 75 overlaps the containers 69.

The supply section 67 overlaps the waste liquid tank 66 when viewed in the second direction D2. Specifically, the mount section 68 overlaps the waste liquid tank 66 when viewed from the second direction D2. Specifically, when viewed in the second direction D2, the storage section 70 overlaps the waste liquid tank 66. In other words, the waste liquid tank 66 is attached to the device main body 12 so that the storage section 70 overlaps the waste liquid tank 66.

The supply section 67 overlaps the maintenance section 65 when viewed in the second direction D2. Specifically, the mount section 68 overlaps the maintenance section 65 when viewed from the second direction D2. Specifically, when viewed from the second direction D2, the storage section 70 overlaps the maintenance section 65. In one example, the storage section 70 overlaps the maintenance section 65 located at the standby position when viewed from the second direction D2. The storage section 70 may overlap the maintenance section 65 located at the maintenance position when viewed from the second direction D2.

The supply section 67 may overlap the recording section 59 when viewed in the second direction D2. When viewed from the second direction D2, the supply section 67 may overlap the recording section 59 located at the recording position P1, or may overlap the recording section 59 located at the retreat position P2. The mount section 68 may overlap the recording section 59 when viewed from the second direction D2. The storage section 70 may overlap the recording section 59 when viewed from the second direction D2. When viewed in the second direction D2, the storage section 70 may overlap the head 60 in a state in which the reference position L1 is positioned below the ejection surface 62.

Figure 14:
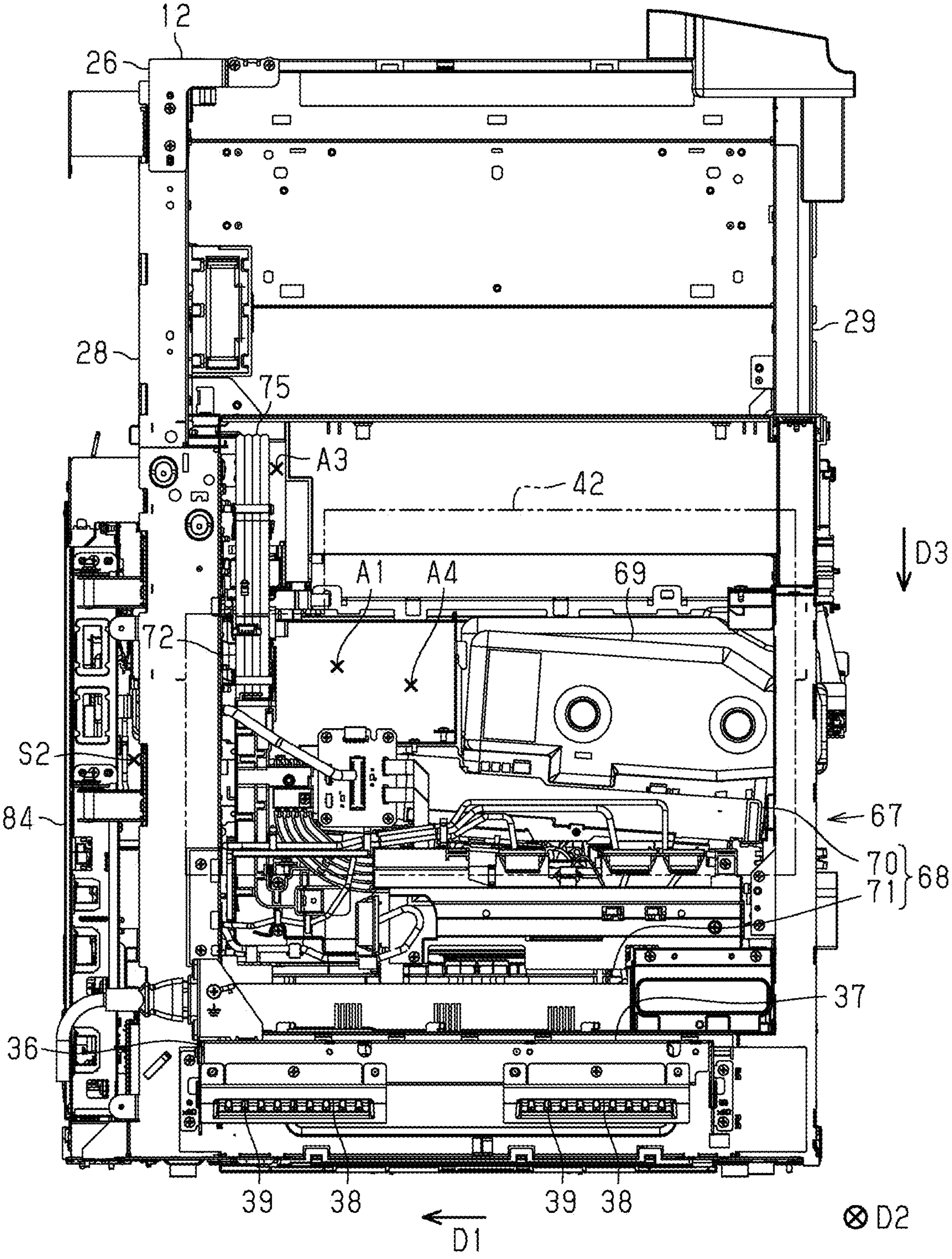
FIG. 14 is a side view in which a first frame is removed from the device main body shown in FIG. 6.

As shown in FIG. 14, the supply section 67 overlaps with the shield plate 42, which is indicated by a two-dot chain line, when viewed in the second direction D2. Specifically, when viewed from the second direction D2, the mount section 68 and the flow path 72 overlap the shield plate 42. Specifically, when viewed from the second direction D2, the storage section 70 and the flow path 72 overlap the shield plate 42. In one example, the relay member 71 does not overlap the shield plate 42, but the relay member 71 may overlap the shield plate 42. In addition to the supply section 67, the containers 69 also overlap the shield plate 42 when viewed from the second direction D2.

As shown in FIG. 13, the device main body 12 has a storage section 76. The storage section 76 is configured to be capable of storing an article. The storage section 76 stores, for example, a manual of the recording device 11. In one example, the storage section 76 is exposed by opening the storage cover 23. Therefore, the user accesses the storage section 76 from the front surface 17 side.

The storage section 76 is housed in the housing 16. The storage section 76 is located at an upper portion in the housing 16. The storage section 76 is located above the recording section 59. The storage section 76 is located above the mount section 68. The storage section 76 overlaps the process section 13 when viewed from the vertical direction D3. The storage section 76 is located directly below the process section 13. The storage section 76 is attached to the housing 16 so that the process section 13 can be stacked thereon. The storage section 76 is attached to the frame section 26. In one example, the storage section 76 is attached to the second frame 28 and the third frame 29.

Figure 15:
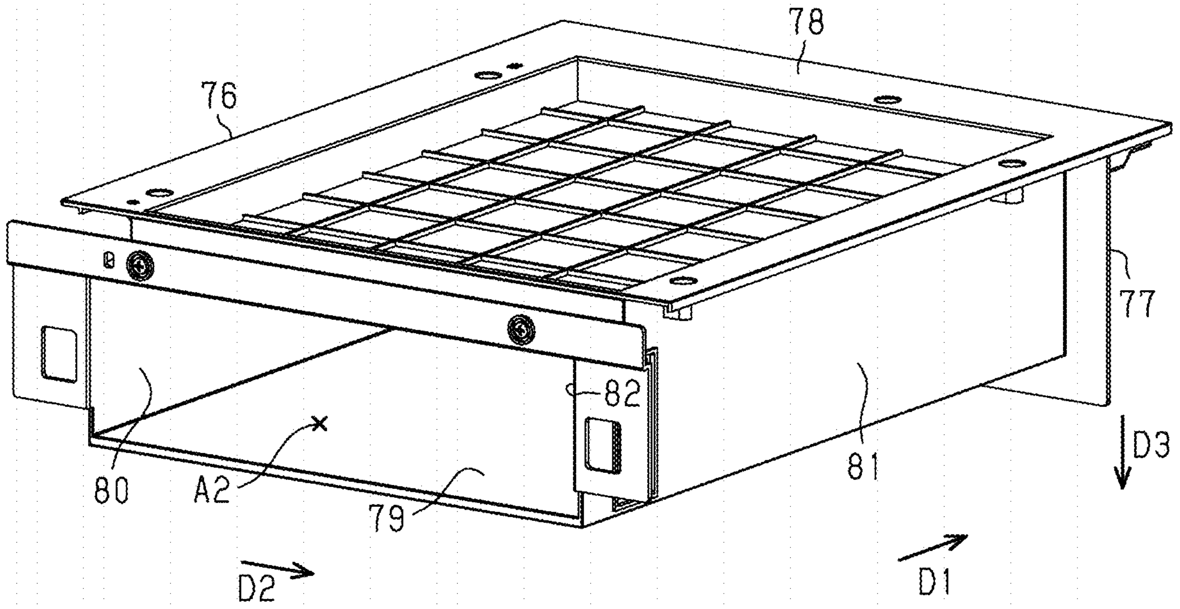
FIG. 15 is a perspective view of a storage section.

As shown in FIG. 15, storage section 76 is a member that defines a storage space A2. The storage section 76 stores an article in the storage space A2. The storage space A2 is a space within the frame space A1. The storage section 76 has a rear plate 77, a top plate 78, a bottom plate 79, a first side plate 80, and a second side plate 81. The storage space A2 is a space surrounded by the rear plate 77, the top plate 78, the bottom plate 79, the first side plate 80, and the second side plate 81.

The rear plate 77 is a plate located in the rear side of the storage section 76. The rear plate 77 extends in the second direction D2 and the vertical direction D3. The top plate 78 is a plate located above the storage section 76. The top plate 78 extends in the first direction D1 and the second direction D2. The top plate 78 supports the process section 13. The bottom plate 79 is a plate located in a lower side of the storage section 76. The bottom plate 79 extends in the first direction D1 and the second direction D2. The first side plate 80 is a plate located on the left side when the device main body 12 is viewed from the first direction D1. The first side plate 80 extends in the first direction D1 and the vertical direction D3. The second side plate 81 is a plate located on the right side when the device main body 12 is viewed from the first direction D1. The second side plate 81 extends in the first direction D1 and the vertical direction D3.

A storage opening 82 is formed in the storage section 76. The storage opening 82 is an opening for the user to access the storage space A2. The storage opening 82 is formed by the rear plate 77, the top plate 78, the bottom plate 79, the first side plate 80, and the second side plate 81.

Figure 16:
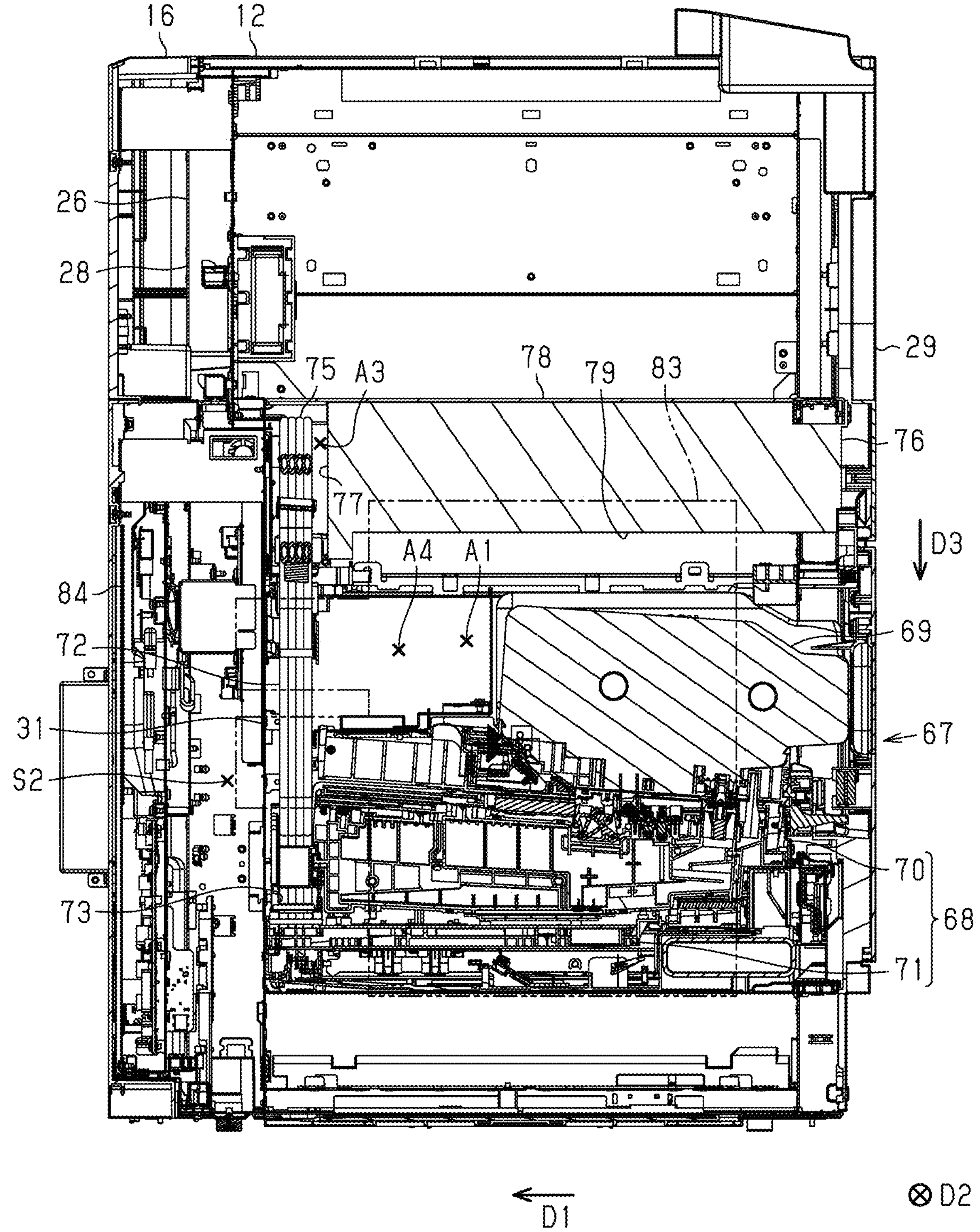
FIG. 16 is a side cross-sectional view of the device main body.
Figure 17:
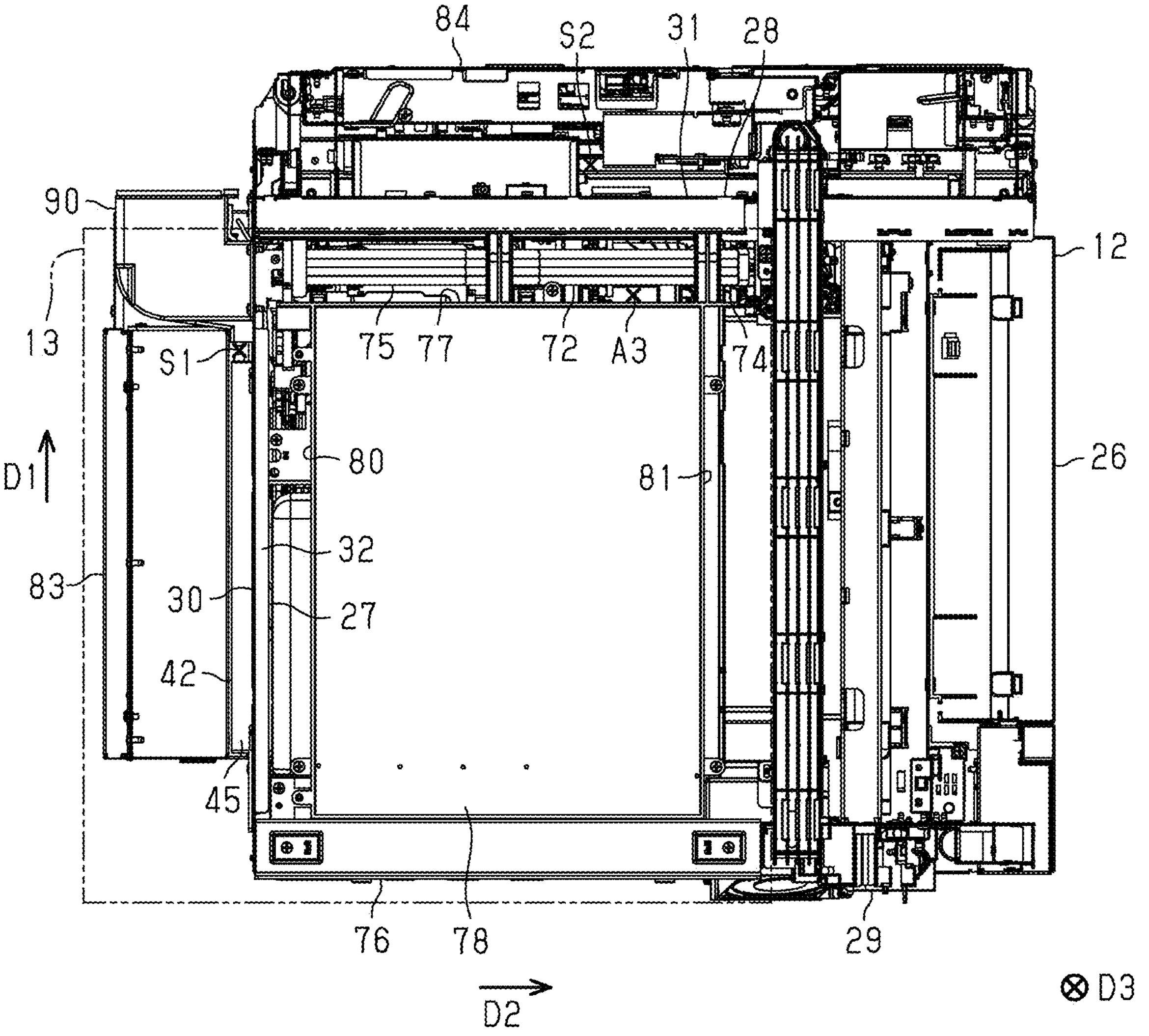
FIG. 17 is a top view of the device main body.

As shown in FIGS. 16 and 17, the storage section 76 defines the flow path space A3. Specifically, the rear plate 77 and the top plate 78 define the flow path space A3. The flow path space A3 is a space within the frame space A1. The flow path space A3 is a space in which the upper section portion 75 is located. In other words, the portion bent in the flow path 72 is located in the flow path space A3. The rear plate 77 and the top plate 78 protect the flow path 72. The flow path space A3 is defined by the second frame 28. The flow path space A3 is defined by the storage section 76 and the second frame 28. The flow path space A3 is a space sandwiched between the storage section 76 and the second frame 28. The flow path space A3 is located between the storage section 76 and the second frame 28 in the first direction D1. Since the flow path 72 is located in the flow path space A3, the degree of bending of the flow path 72 is reduced as compared with the case where the flow path 72 is accommodated only in an accommodation space A4 (to be described later). In the case where the flow path 72 is accommodated only in the accommodation space A4, the accommodation space A4 may be enlarged in order to reduce the degree of bending of the flow path 72. In this case, there is a possibility that the device main body 12 becomes large in size. However, since the flow path 72 is located in the flow path space A3, the possibility that the device main body 12 becomes large in size is reduced.

The flow path space A3 communicates with the space outside of the frame through the frame opening 35. In other words, the flow path space A3 communicates with the outside of the frame space A1 through the frame opening 35. Therefore, through the through holes 21, the housing openings 24, and the frame opening 35, air can flow into the flow path space A3 from the outside of the housing 16, or air can flow out from the flow path space A3 to the outside of the housing 16. The present disclosure is not limited to this, and air may enter into and exit from the flow path space A3 through gaps between the frames, gaps between the frame section 26 and the housing 16, or the like.

The storage section 76 defines the accommodation space A4. Specifically, the bottom plate 79 defines the accommodation space A4. The accommodation space A4 is a space within the frame space A1. In one example, the storage section 76 partitions the frame space A1 into the storage space A2, the flow path space A3, and the accommodation space A4. The accommodation space A4 is a space for accommodating the recording section 59, the mount section 68, and the like. In one example, the accommodation space A4 is a space below the storage section 76. The accommodation space A4 is a space surrounded by the storage section 76, the first frame 27, and the second frame 28. The accommodation space A4 communicates with the flow path space A3. Therefore, air can flow into the accommodation space A4 from the outside of the housing 16 through the through holes 21, the housing openings 24, and frame opening 35, or air can flow out from the accommodation space A4 to the outside of the housing 16. The present disclosure is not limited to this, and air may enter into and exit from the accommodation space A4 through gaps between the frames, gaps between the frame section 26 and the housing 16, or the like.

Figure 18:
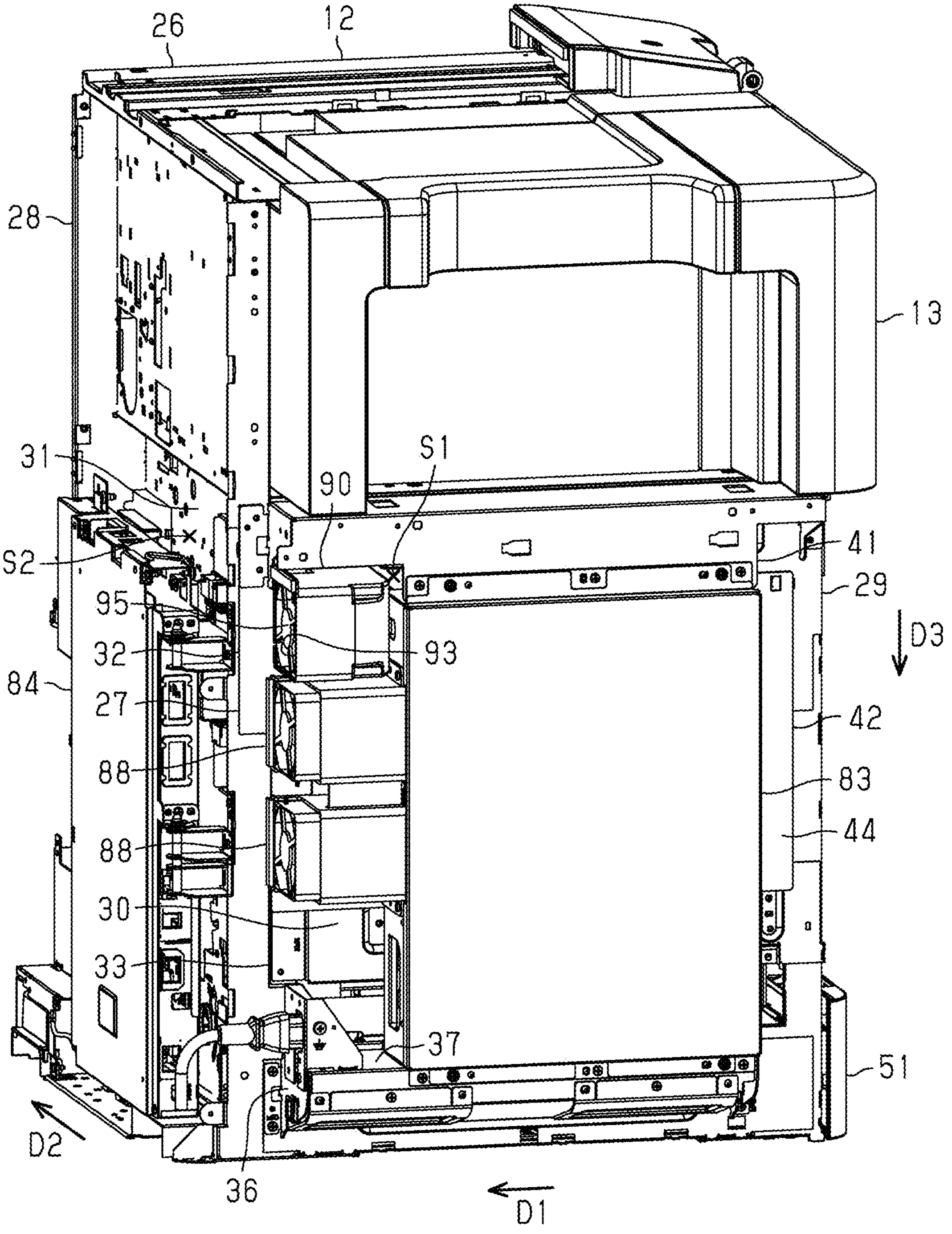
FIG. 18 is a perspective view of the device main body showing the substrate unit.

As shown in FIGS. 17 and 18, the device main body 12 has one or more substrate units. Specifically, the device main body 12 has a first substrate unit 83 and a second substrate unit 84. In one example, the first substrate unit 83 is a substrate unit that controls the power supplied to the device main body 12. The second substrate unit 84 is a substrate unit that controls the drive of the device main body 12.

The substrate unit is attached to the frame section 26. Specifically, the substrate unit is attached to the frame. In one example, the substrate unit is fixed so as not to displace with respect to the frame. The substrate unit may be attached to the frame so that it can open and close with respect to the frame, for example.

The first substrate unit 83 is attached to the first frame 27. Specifically, the first substrate unit 83 is attached to the support frame 36 and the attachment frame 41. The first substrate unit 83 is attached to the first frame 27 through the support frame 36 and the attachment frame 41. The first substrate unit 83 faces the first facing surface 30. The first substrate unit 83 is adjacent to the supply section 67. Specifically, the first substrate unit 83 is located close to the storage section 70, the relay member 71, and the flow path 72.

As shown in FIG. 16, when viewed from the second direction D2, the first substrate unit 83, which is indicated by a two-dot chain line, overlaps the storage section 70, the relay member 71, and the flow path 72. When viewed from the second direction D2, the first substrate unit 83 overlaps the accommodation space A4.

As shown in FIGS. 17 and 18, the second substrate unit 84 is attached to the second frame 28. The second substrate unit 84 faces the second facing surface 31. The second substrate unit 84 is located close to the supply section 67. Specifically, the second substrate unit 84 is located close to the storage section 70, the relay member 71, and the flow path 72.

Figure 19:
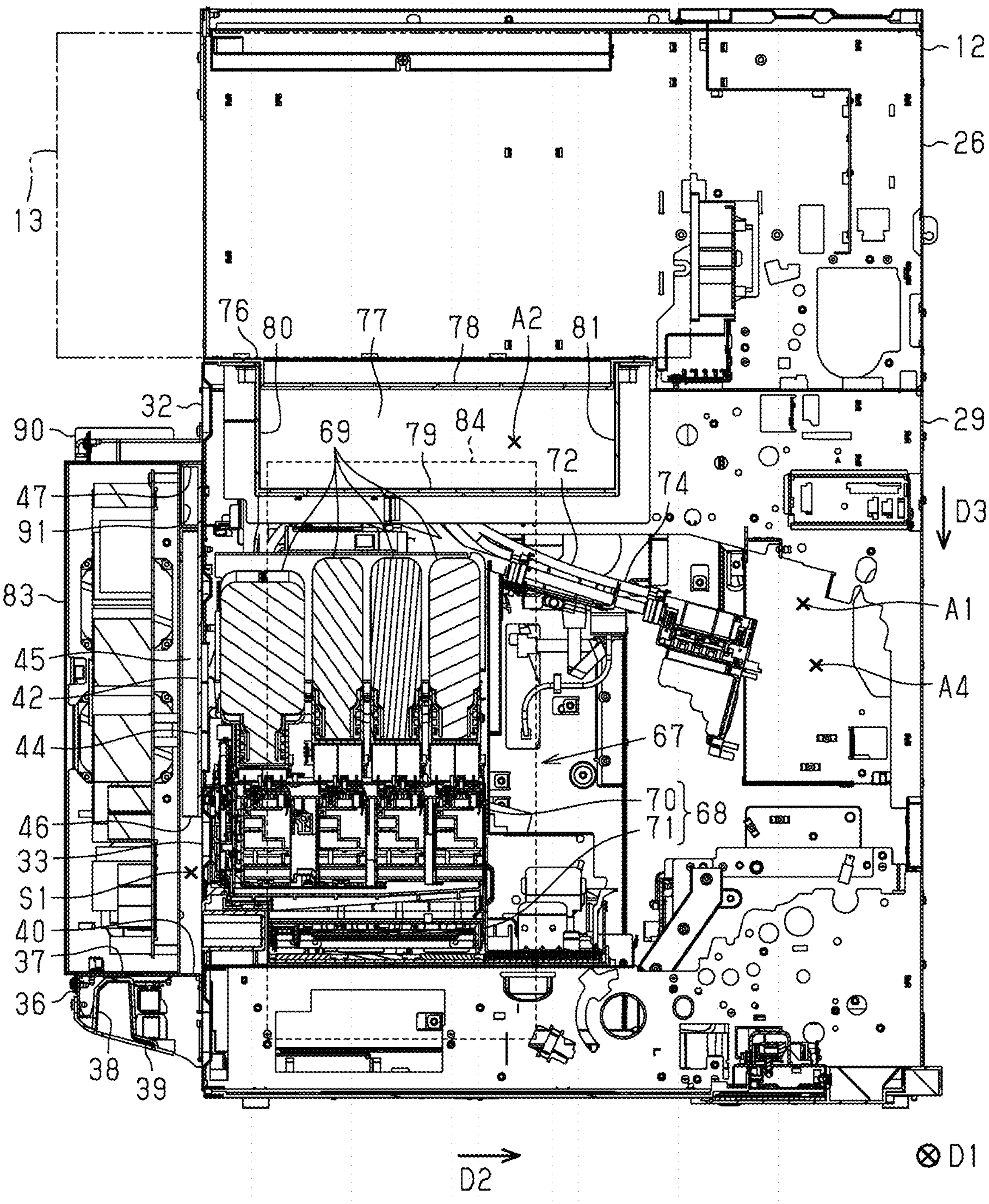
FIG. 19 is a cross-sectional view of the device main body.

As shown in FIGS. 17 and 19, the second substrate unit 84 overlaps the storage section 70, the relay member 71, and the flow path 72 when viewed from the first direction D1. When viewed from the first direction D1, the second substrate unit 84 overlaps the flow path space A3. Therefore, when viewed from the first direction D1, the second substrate unit 84 overlaps the upper section portion 75. When viewed from the first direction D1, the second substrate unit 84 overlaps the accommodation space A4. Note that in FIG. 19, the second substrate unit 84 is indicated by a broken line.

The substrate unit generates heat. Since the substrate unit is attached to the frame, the heat of the substrate unit easily reaches the frame space A1. In particular, the heat of the substrate unit tends to reach the supply section 67. This is because a distance between the substrate unit and the supply section 67 is short. When heat is applied to the supply section 67, the liquid may be heated. In this case, the recording section 59 may not be able to eject the liquid normally.

The heat of the first substrate unit 83 tends to reach the storage section 70, the relay member 71, and the flow path 72 located in the accommodation space A4. Heat of the second substrate unit 84 tends to reach the storage section 70, the relay member 71, and the flow path 72 located in the accommodation space A4. Since the second substrate unit 84 is located along the second frame 28, the heat of the second substrate unit 84 easily reaches the flow path 72 located in the flow path space A3. In other words, the heat of the second substrate unit 84 tends to reach the upper section portion 75.

The substrate unit is attached to the frame to define a flow space between the substrate unit and the frame. The substrate unit is attached to the frame so as to define a flow space between the substrate unit and the frame. The first substrate unit 83 is attached to the first frame 27 so as to define a first flow space S1 between the first substrate unit 83 and the first frame 27. The second substrate unit 84 is attached to the second frame 28 so as to form a second flow space S2 between the second substrate unit 84 and the second frame 28.

The flow space is a space in which air flows. The flow space is a space inside the housing 16 and a space outside the frame section 26. The flow space is a space between the substrate unit and the facing surface. In other words, the first flow space S1 is a space between the first substrate unit 83 and the first facing surface 30. The second flow space S2 is a space between the second substrate unit 84 and the second facing surface 31. When air flows in the flow space, the substrate unit is cooled, and heat propagating from the substrate unit to the supply section 67 through the frame section 26 is reduced. For example, air flows through the flow space by air flowing into the flow space from outside the housing 16 and air flowing out of the flow space to outside the housing 16, through gaps, openings, and the like of the housing 16.

As shown in FIG. 19, the first flow space S1 communicates with the ventilation openings 39, the continuous openings 40, and the first flow opening 46. In other words, the first flow space S1 communicates with the outside of the housing 16 through the handhold portions 38. Therefore, air flows into the first flow space S1 or flows out from the first flow space S1 through the handhold portions 38. The first flow space S1 communicates with the second flow opening 47 and the through holes 21. Therefore, air flows into the first flow space S1 or flows out from the first flow space S1 through the through holes 21. At this time, since the partition ribs 45 guide air, the air easily flows in the first flow space S1. In the second flow space S2, air flows into the second flow space S2 from the outside of the housing 16 or flows out from the second flow space S2 to the outside of the housing 16 through gaps, openings, or the like of the housing 16 including the through holes 21 and the housing openings 24.

As shown in FIGS. 18 and 19, the first substrate unit 83 is attached to the first frame member 32 and the second frame member 33. The first substrate unit 83 is attached so as to cover the gap between the first frame member 32 and the second frame member 33. The first substrate unit 83 is attached so as to straddle the first frame member 32 and the second frame member 33. The first substrate unit 83 is attached to the first frame member 32 and the second frame member 33 so as to cover the exposure opening 34. The first substrate unit 83 may be attached to the frame section 26 so as to be openable and closable.

The first substrate unit 83 is located so as not to protrude from the process section 13 in the second direction D2. In other words, when viewed from the first direction D1, the first substrate unit 83 is located at a position that is in the second direction D2 from an end surface of the process section 13. The end surface of the process section 13 is a surface that becomes a leading end in the direction opposite to the second direction D2. In one example, the first side surface 19 is located so as to be flush with the end surface of the process section 13. Therefore, the possibility that the foot space of the device main body 12 is increased by the first substrate unit 83 is reduced.

The first substrate unit 83 is located so as to overlap the shield plate 42 when viewed from the second direction D2. The first substrate unit 83 faces the shield surface 44. The shield plate 42 makes it difficult for the heat from the first substrate unit 83 to reach the supply section 67. In one example, a portion of the first substrate unit 83 overlaps the shield plate 42. It is desirable that a portion of the first substrate unit 83 with the highest heat generation overlaps the shield plate 42.

Figure 20:
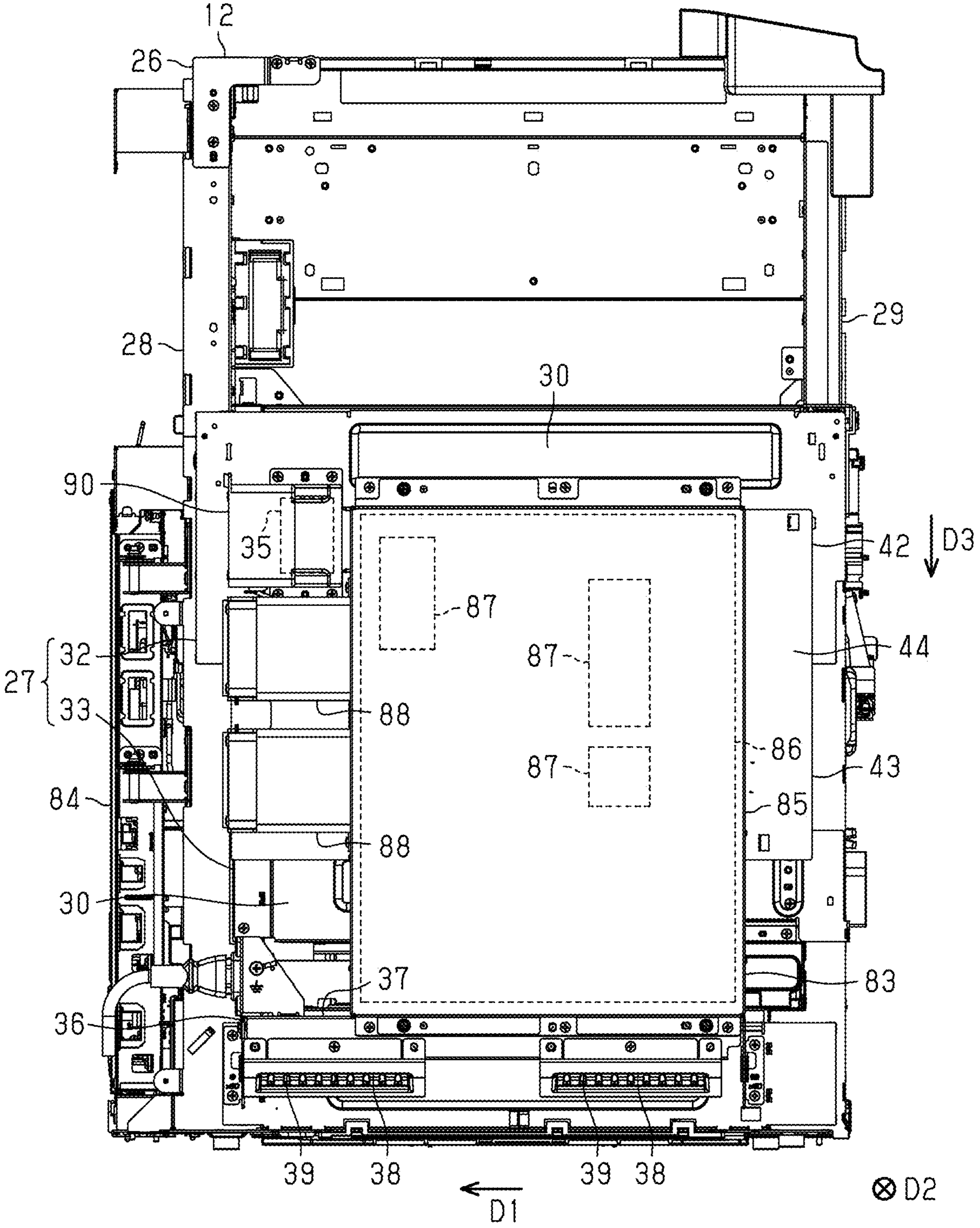
FIG. 20 is a side view of the device main body shown in FIG. 11 to which the substrate unit is attached.

As shown in FIG. 20, the first substrate unit 83 has a power supply case 85 and a power supply substrate 86. The power supply case 85 houses the power supply substrate 86. The power supply substrate 86 has one or more heat generation elements 87. The heat generation elements 87 include elements that generate heat by electric power. The heat generation elements 87 are, for example, circuits such as converters or inverters. The heat generation elements 87 overlap the shield plate 42 when viewed from the second direction D2. By this, it is difficult for the heat of the heat generation element 87 to reach the supply section 67. Therefore, the heat of the first substrate unit 83 is effectively shielded by the shield plate 42. Like the first substrate unit 83, the second substrate unit 84 has a control case and a control substrate.

The first substrate unit 83 has one or more exhaust sections 88. In one example, the first substrate unit 83 has two exhaust sections 88. The exhaust sections 88 are attached to the power supply case 85. The exhaust sections 88 are configured to exhaust air from the power supply case 85. The exhaust sections 88 include, for example, fans. In one example, the exhaust sections 88 exhaust air from the power supply case 85 in the first direction D1. The air discharged from the power supply case 85 is discharged to the outside of the housing 16 through gaps, openings, or the like of the housing 16. The temperature rise of the first substrate unit 83 is suppressed by the exhaust sections 88.

The device main body 12 has a duct 90. The duct 90 is attached to the first frame 27. Specifically, the duct 90 is attached to the first frame member 32. The duct 90 communicates with the through holes 21. The duct 90 communicates with the frame opening 35. The duct 90 communicates with the second flow opening 47.

The duct 90 brings the flow space into communication with the outside of the housing 16. Specifically, the duct 90 brings the first flow space S1 into communication with the outside of the housing 16. The duct 90 brings the first flow space S1 into communication with the outside of the housing 16 through the second flow opening 47 and the through holes 21. The duct 90 brings the flow path space A3 into communication with the outside of the housing 16 through the frame opening 35 and the through holes 21. The duct 90 brings the first flow space S1 into communication with the flow path space A3 through the frame opening 35 and the second flow opening 47. Therefore, the duct 90 divides the air flowing into from the outside of the housing 16 into the flow path space A3 and the first flow space S1, or merges the air flowing in the flow path space A3 and the air flowing in the first flow space S1 and then discharges the merged air to the outside of the housing 16.

Figure 21:
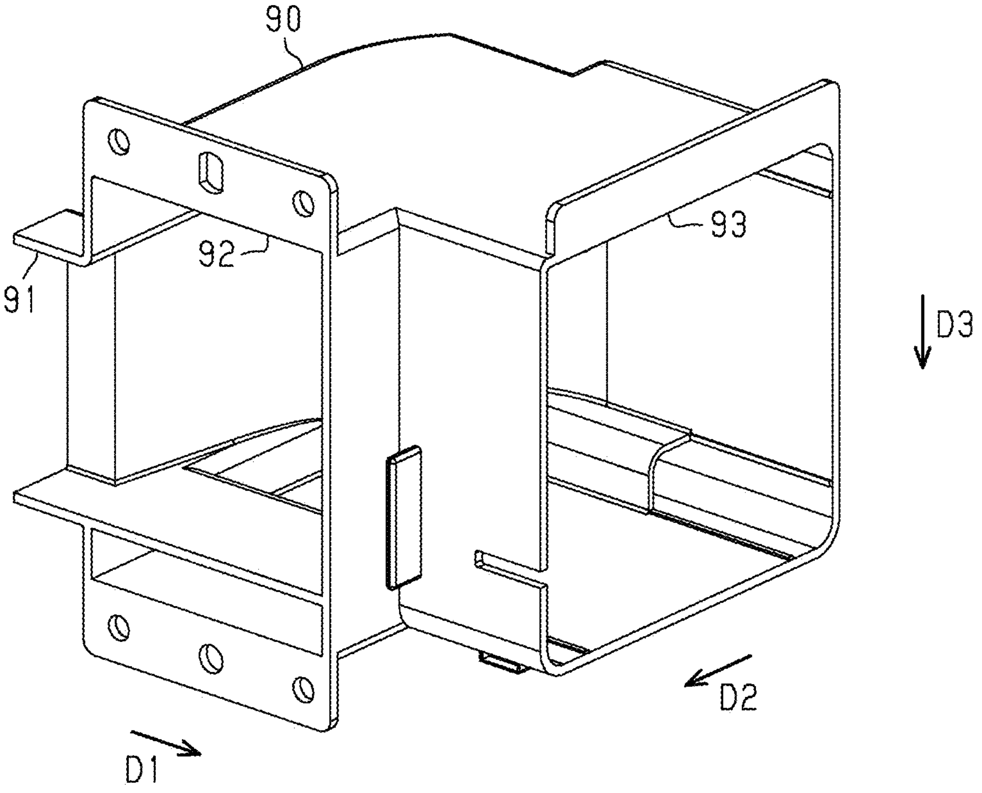
FIG. 21 is a perspective view of a duct.

As shown in FIG. 21, a plurality of duct openings are formed in the duct 90. In one example, the duct 90 has a first duct opening 91, a second duct opening 92, and a third duct opening 93. In the duct 90, the first duct opening 91, the second duct opening 92, and the third duct opening 93 communicate with each other. The first duct opening 91 opens facing in the opposite direction of the first direction D1. The second duct opening 92 opens facing in the second direction D2. The third duct opening 93 opens facing in the first direction D1.

As shown in FIGS. 10 and 19, the first duct opening 91 communicates with the second flow opening 47. The first duct opening 91 faces the second flow opening 47. Therefore, the duct 90 communicates with the first flow space S1.

The duct 90 is located in a position overlapping the flow space when viewed from the first direction D1. Specifically, the duct 90 is located in a position overlapping the first flow space S1 when viewed from the first direction D1. By this, the duct 90 can easily communicates with the first flow space S1. In other words, the first duct opening 91 can easily face the second flow opening 47.

Figure 22:
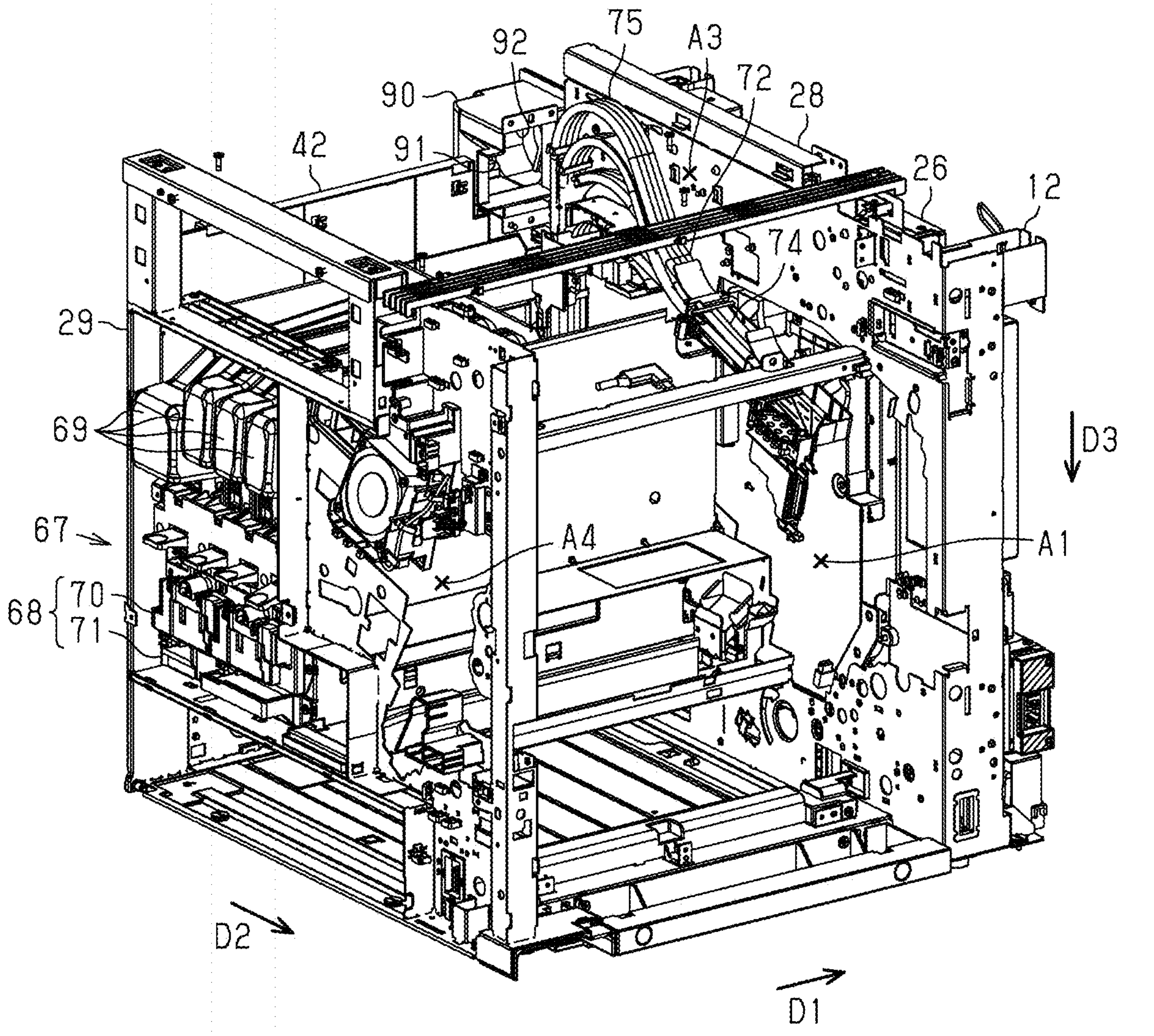
FIG. 22 is a perspective view in which the first frame is removed from the device main body shown in FIG. 7.

As shown in FIGS. 7 and 22, the second duct opening 92 communicates with the frame opening 35. The second duct opening 92 faces the frame opening 35. Therefore, the duct 90 communicates with the flow path space A3.

As shown in FIG. 17, the duct 90 is aligned with the flow path space A3 in the second direction D2. The duct 90 is located in a position that overlaps the flow path space A3 when viewed from the second direction D2. By this, the duct 90 can easily communicates with the flow path space A3. In other words, the second duct opening 92 is more likely to face the frame opening 35.

As shown in FIGS. 3 and 18, the third duct opening 93 communicates with the through holes 21. The third duct opening 93 faces the through holes 21. Therefore, the duct 90 communicates with the outside of the housing 16. When the through holes 21 open to the first side surface 19, the third duct opening 93 is formed so as to open toward the direction opposite to the second direction D2 in the duct 90.

An uppermost end portion of the duct 90 is located at or above an uppermost end portion of the first substrate unit 83. Air heated in the first substrate unit 83 tends to stay in the upper part of the housing 16. For example, the air heated by the first substrate unit 83 tends to stay above the first flow space S1 or in the flow path space A3. Therefore, the air heated in the first substrate unit 83 is likely to flow together with air flowing into the housing 16 from the duct 90 or air flowing out of the housing 16 from the duct 90. By this, the possibility that the air heated in the first substrate unit 83 stays in the housing 16 is reduced.

The uppermost end portion of the duct 90 is located at or above an uppermost end portion of the second substrate unit 84. Air heated in the second substrate unit 84 tends to stay in the upper portion of the housing 16. For example, the air heated by the second substrate unit 84 tends to stay in the flow path space A3. Therefore, the air heated in the second substrate unit 84 is likely to flow together with air flowing into the housing 16 from the duct 90 or air flowing out of the housing 16 from the duct 90. By this, the possibility that the air heated in the second substrate unit 84 stays in the housing 16 is reduced.

As shown in FIG. 18, the device main body 12 has a fan 95. The fan 95 is attached to the duct 90. The fan 95 is located in the duct 90. When the fan 95 is driven, air is facilitated to flow in the flow path space A3 and the first flow space S1.

The fan 95 is driven to discharge air from the duct 90 to the outside of the recording device 11. In other words, the fan 95 is driven to exhaust air from the inside of the housing 16 toward the outside of the housing 16. The fan 95 is driven so that the air flowing in from the first duct opening 91 and the second duct opening 92 is discharged from the third duct opening 93. By this, air flows into the first flow space S1 through the housing openings 24, the ventilation openings 39, the continuous openings 40, and the first flow opening 46, and air flows out through the second flow opening 47, the first duct opening 91, the third duct opening 93, and the through holes 21. Air flows into the flow path space A3 through gaps, openings, or the like of the housing 16, and flows out through the frame opening 35, the second duct opening 92, the third duct opening 93, and the through holes 21.

The fan 95 may be driven so as to cause air to flow into the recording device 11 from the duct 90. In other words, the fan 95 may be driven so as to suck air from the outside of the housing 16 toward the inside of the housing 16. The fan 95 may be driven so as to discharge air flowing in through the third duct opening 93 from the first duct opening 91 and the second duct opening 92. By this, air flows into the first flow space S1 through the through holes 21, the third duct opening 93, the first duct opening 91, and the second flow opening 47, and air flows out through the first flow opening 46, the continuous openings 40, the ventilation openings 39, and the housing openings 24. Air flows into the flow path space A3 through the through holes 21, the third duct opening 93, the second duct opening 92, and the frame opening 35, and air flows out through gaps, openings, or the like of the housing 16.

Operations and Effects

Next, the operation and effect of the above mentioned embodiment will be described.

(1) The substrate unit is provided so as to define a flow space in which air flows between the substrate unit and the frame. The substrate unit is attached to the frame so as to define a flow space through which air flows between the substrate unit and the frame. In other words, the first substrate unit 83 is attached to the first frame 27 so as to define the first flow space S1. The second substrate unit 84 is attached to the second frame 28 so as to define the second flow space S2. According to the above configuration, the air flowing through the flow space makes it more difficult for the heat of the substrate unit to reach the supply section 67. By this, a possibility that the supply section 67 is heated by the substrate unit is reduced.

(2) The housing 16 has the through holes 21 that bring the first flow space S1 into communication with the outside of the housing 16. According to the above configuration, air flows into the first flow space S1 through the through holes 21, or air flows out of the first flow space S1 through the through holes 21, so that air is facilitated to flow in the first flow space S1. By this, a possibility that the supply section 67 is heated by the first substrate unit 83 is reduced.

(3) The shield plate 42 is attached to the first frame member 32 and the second frame member 33 to cover the exposure opening 34. According to the above configuration, a possibility that the heat of the first substrate unit 83 reaches the supply section 67 through the exposure opening 34 is reduced.

(4) The shield plate 42 is provided between the supply section 67 and the first substrate unit 83. The shield plate 42 overlaps the supply section 67 when the first facing surface 30 is viewed from the front side. According to the above configuration, the heat from the first substrate unit 83 to the supply section 67 is effectively shielded by the shield plate 42.

(5) The supply section 67 is located between the first frame 27 and the transport section 53 when viewed from the first direction D1. According to the above configuration, the heat from the first substrate unit 83 less likely to reach the transport section 53.

(6) The duct 90 brings the first flow space S1 into communication with the flow path space A3. According to the above configuration, both the first flow space S1 and the flow path space A3 communicates with the outside of the recording device 11 through the duct 90. By this, the configuration of the recording device 11 is simplified as compared with the case where the first flow space S1 and the flow path space A3 are individually brought into communication with the outside of the recording device 11. When air flows through the first flow space S1 and the flow path space A3, a possibility that the supply section 67 is heated by the substrate unit is reduced.

(7) The duct 90 communicates with the through holes 21. According to the above configuration, the first flow space S1 and the flow path space A3 communicate with the outside of the recording device 11 through the through holes 21 and the duct 90. By this, a possibility that the heat of the substrate unit stays in the housing 16 is reduced.

(8) The through holes 21 are open to the rear surface 18. Usually, the user operates the recording device 11 from the front surface 17 side. Therefore, according to the above configuration, a possibility that air flowing into the housing 16 through the through holes 21 or air flowing out of the housing 16 through the through holes 21 reaches the user is reduced.

(9) The duct 90 is located in a position that overlaps the first flow space S1 when viewed from the first direction D1 and in a position that overlaps the flow path space A3 when viewed from the second direction D2. According to the above configuration, the duct 90 is facilitated to communicate with the first flow space S1 and the flow path space A3.

(10) The flow path space A3 is defined by the second frame 28 and the storage section 76. According to the above configuration, the flow path 72 can be protected by the second frame 28 and the storage section 76.

(11) The process section 13 is located above the storage section 76 and overlaps the storage section 76 when viewed from the vertical direction D3. According to the above configuration, a possibility that the foot space of the recording device 11 is increased by the process section 13 is reduced.

(12) The uppermost end portion of the duct 90 is located at or above the uppermost end portion of the first substrate unit 83 and at or above the uppermost end portion of the second substrate unit 84 in the vertical direction D3. The air heated in the substrate unit tends to stay in the upper portion. Therefore, according to the above configuration, the air heated in the substrate unit is likely to flow together with air flowing into the device from the duct 90 or air flowing out of the device from the duct 90. By this, a possibility that the air heated in the substrate unit stays in the device is reduced.

(13) The recording device 11 is provided with the fan 95 that discharges air from the duct 90 to the outside of the housing 16. According to the above configuration, a possibility that the supply section 67 is heated by the substrate unit is reduced.

(14) The recording device 11 has the fan 95 that allows air to flow from the duct 90 into the housing 16. According to the above configuration, a possibility that the supply section 67 is heated by the substrate unit is reduced.

Modifications

The above mentioned embodiment can be modified as follows. The above mentioned embodiments and the following modifications can be implemented in combination with each other within a range that is not technically contradictory.

Figure 23:
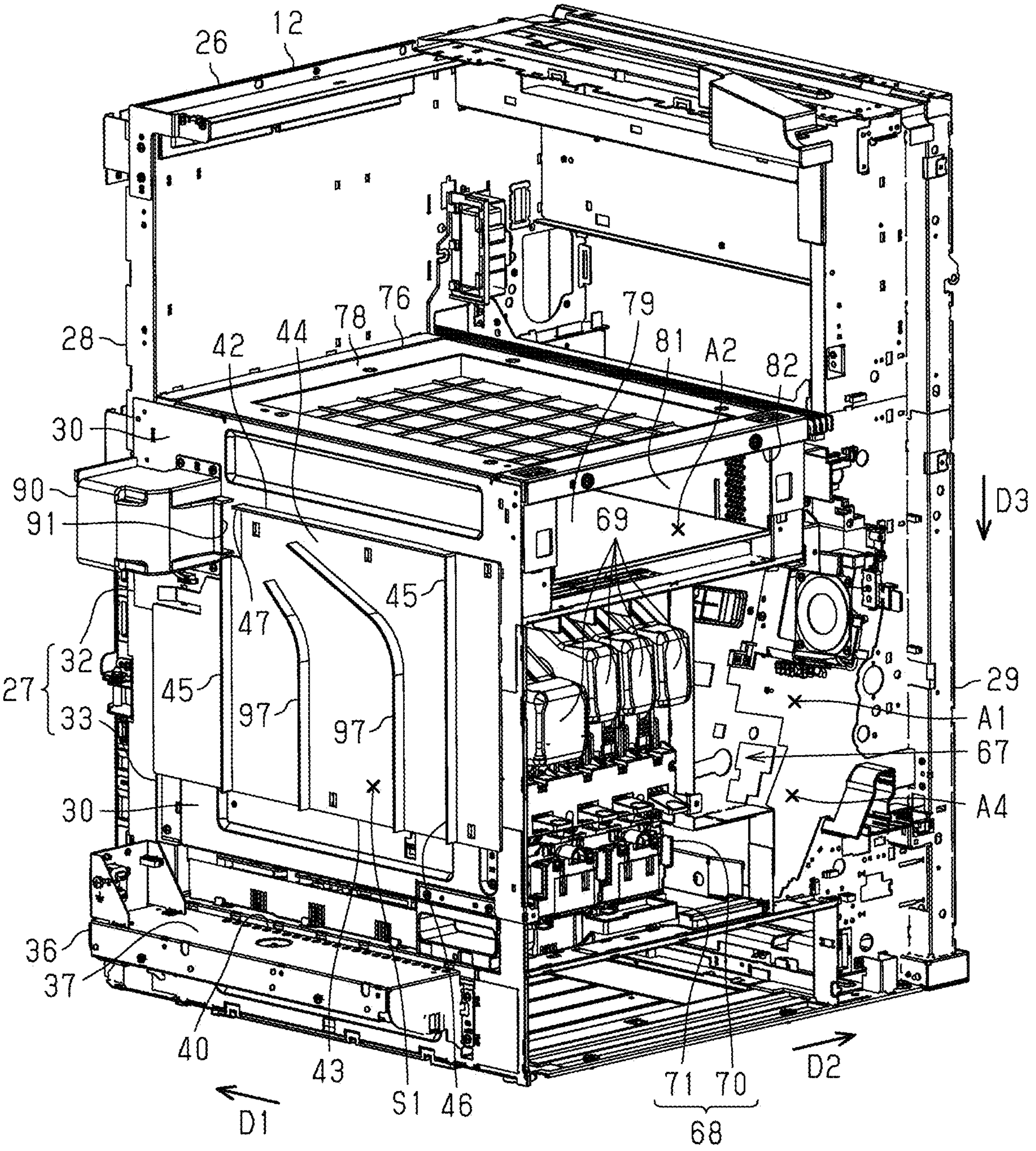
FIG. 23 is a perspective view of the device main body showing a modification example of the shield plate.
Figure 24:
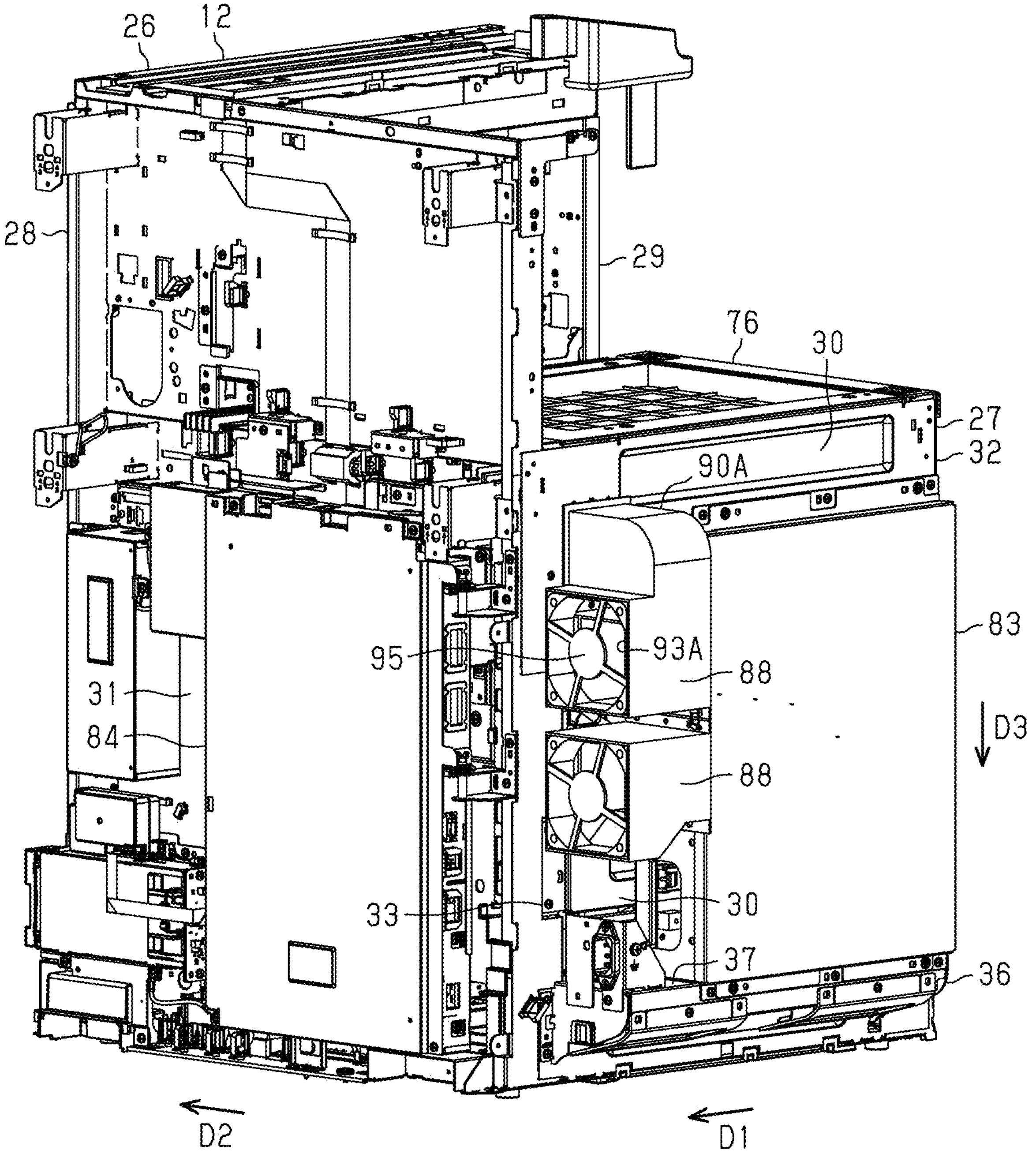
FIG. 24 is a perspective view of the device main body showing a modification example of an exhaust section.

- As shown in FIG. 23, the shield plate 42 may have one or more guide ribs 97. In this modification, the shield plate 42 has two guide ribs 97. The guide ribs 97 extends perpendicularly from the shield surface 44. Two guide ribs 97 are located between the partition ribs 45. The guide ribs 97 extend from the first flow opening 46 toward the second flow opening 47. By this, air is more easily guided. Therefore, the cooling efficiency is improved.
- As shown in FIG. 24, the exhaust section 88 may have a fan 95. In this modified example, one exhaust section 88 of the two exhaust sections 88 of the first substrate unit 83 also serves as the fan 95. Therefore, the exhaust section 88 also serves as the duct 90. In other words, it can be said that the duct 90 and the fan 95 constitute the exhaust section 88. In this modified example, the duct 90, which also serves as the exhaust section 88, is referred to as a duct 90A.

Figure 25:
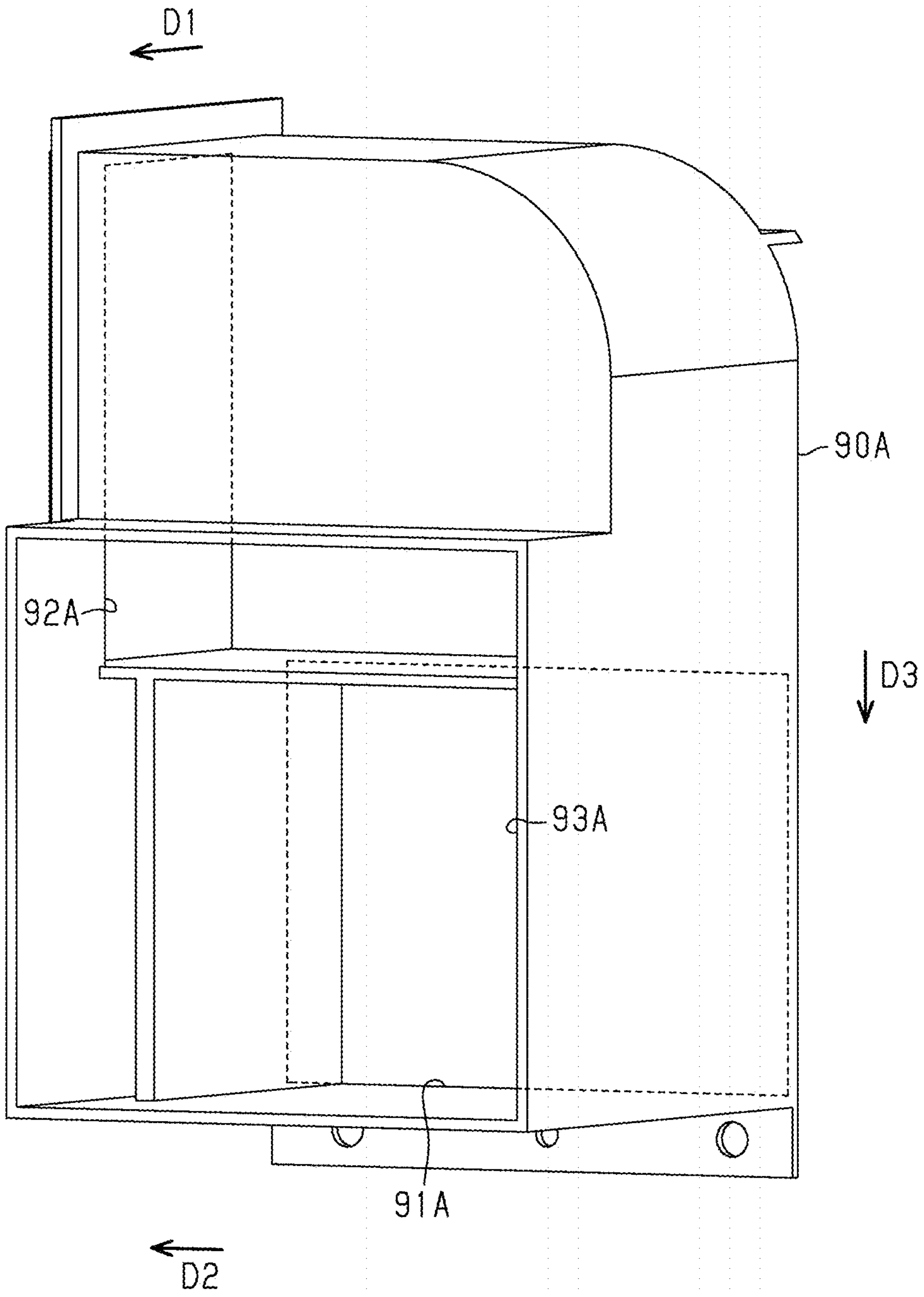
FIG. 25 is a perspective view showing a duct of the modification example shown in FIG. 24.

As shown in FIG. 25, the duct 90A is formed with a first duct opening 91A, a second duct opening 92A, and a third duct opening 93A. The first duct opening 91A communicates with the second flow opening 47. The first duct opening 91A also communicates with the inside of the power supply case 85. Therefore, when the exhaust section 88 is driven, air flows out from the power supply case 85 to the outside of the recording device 11 through the duct 90A.

Figure 26:
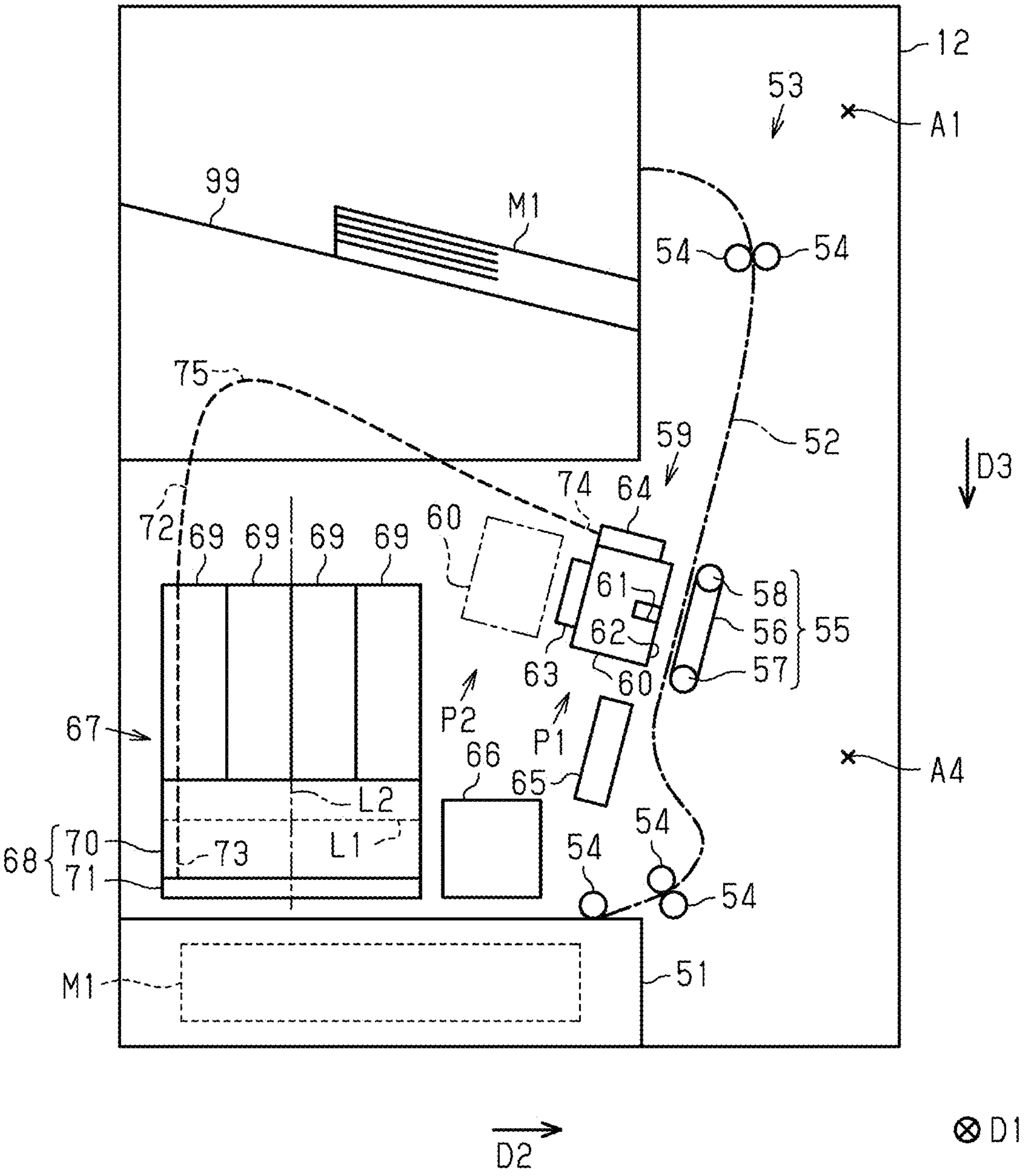
FIG. 26 is a front view showing a modification example of the recording device.
Figure 27:
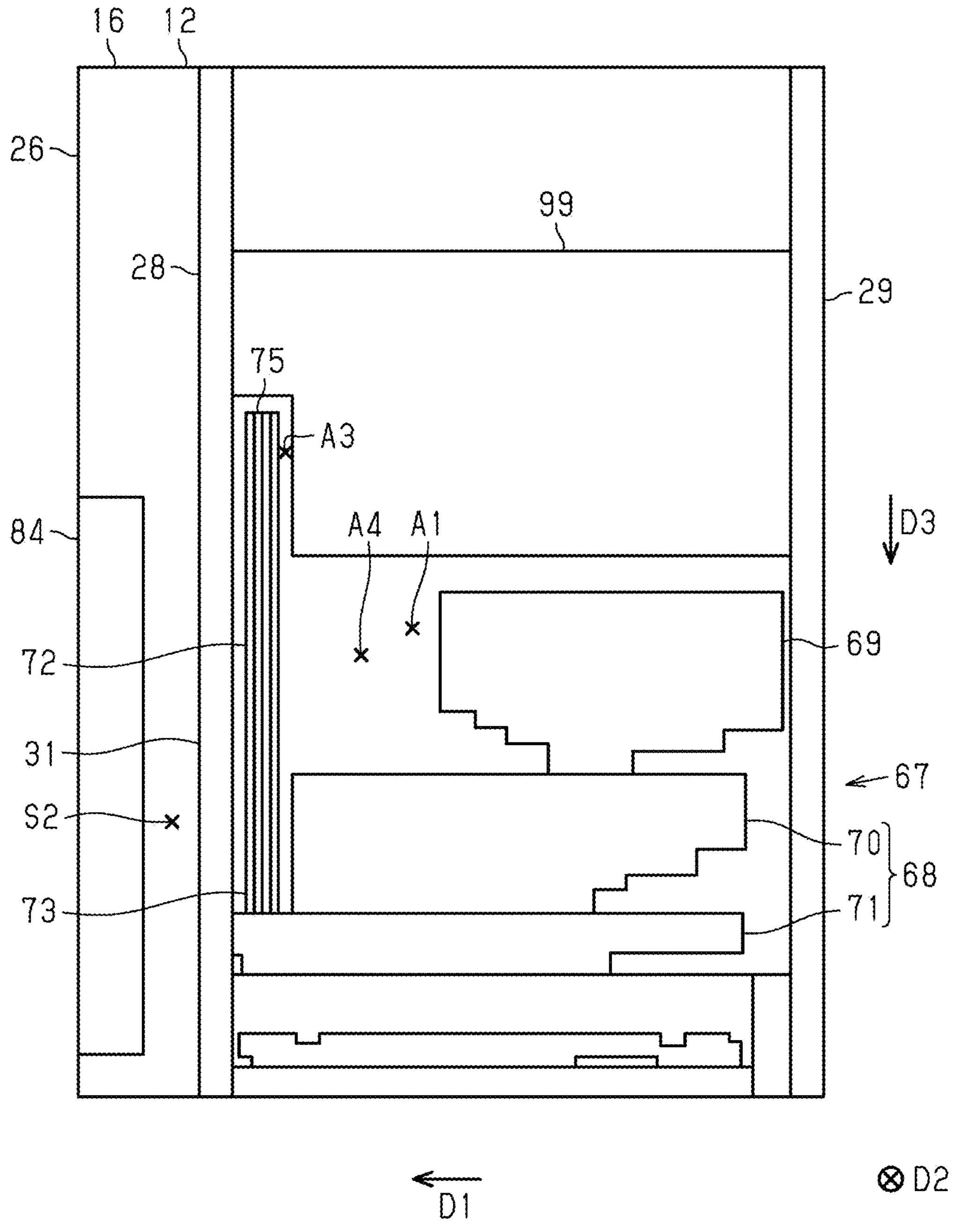
FIG. 27 is a side view of the recording device shown in FIG. 26.

- As shown in FIGS. 26 and 27, the device main body 12 may have a stacking section 99. The medium M1 recorded on is stacked on the stacking section 99. The stacking section 99 is, for example, a tray. The stacking section 99 is located in an upper portion of the housing 16. The stacking section 99 is located above the recording section 59. The stacking section 99 is located above the mount section 68. The stacking section 99 overlaps the recording section 59 when viewed from the vertical direction D3. Specifically, the stacking section 99 overlaps the head 60 located at the recording position P1 when viewed from the vertical direction D3. When viewed from the vertical direction D3, the stacking section 99 overlaps the head 60 located at the retreat position P2. The stacking section 99 overlaps the mount section 68 when viewed from the vertical direction D3. Specifically, the stacking section 99 overlaps the storage section 70 when viewed from the vertical direction D3. The stacking section 99 overlaps the relay member 71 when viewed from the vertical direction D3. Note that in this modification, the storage section 76 and the process section 13 may or may not be provided.
- The flow path space A3 may be defined by the stacking section 99. Specifically, the flow path space A3 may be defined by the second frame 28 and the stacking section 99. In this case, the flow path 72 is protected by the second frame 28 and the stacking section 99.

Figure 28:
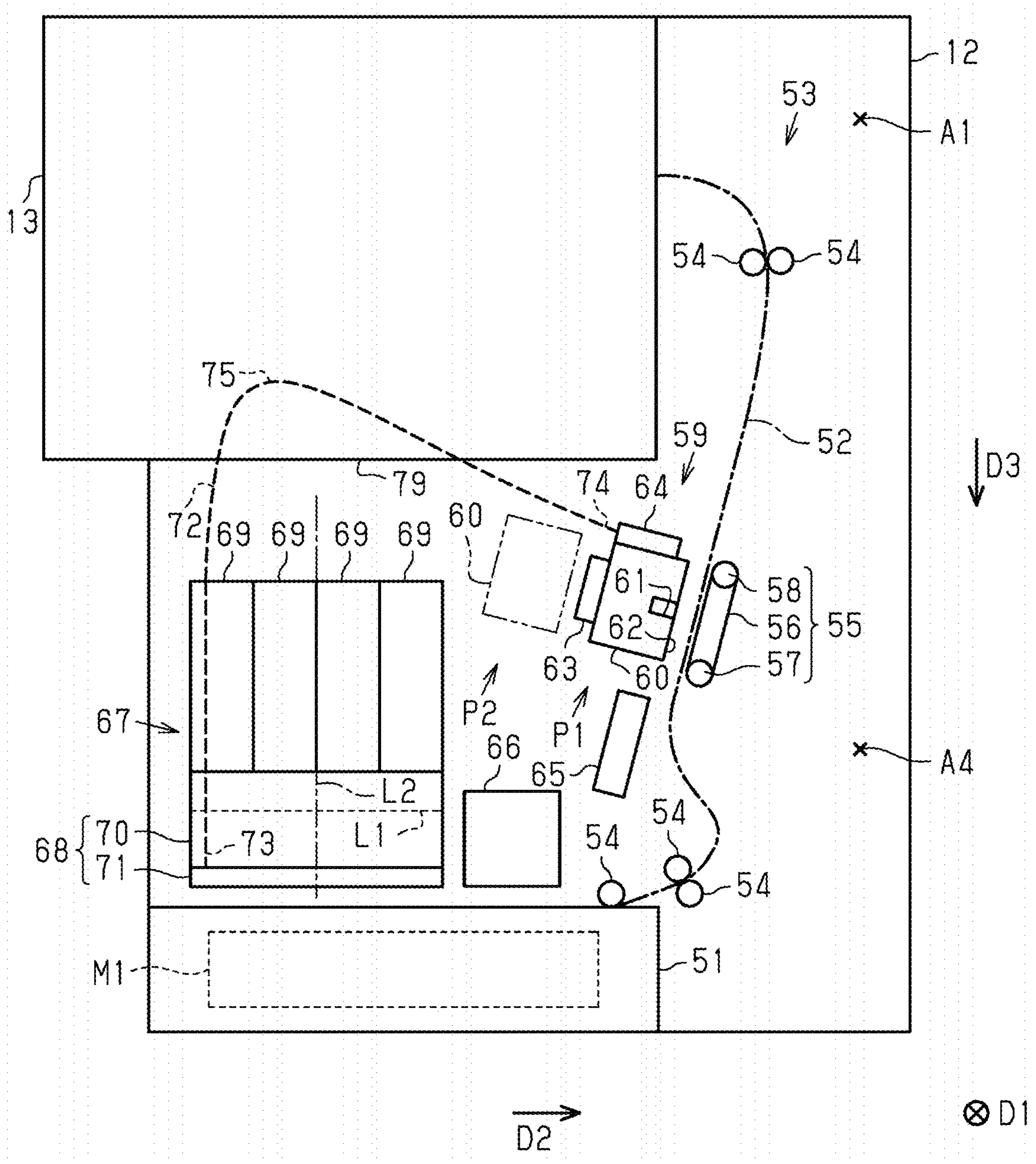
FIG. 28 is a front view of a recording device showing a modification example different from FIG. 26.
Figure 29:
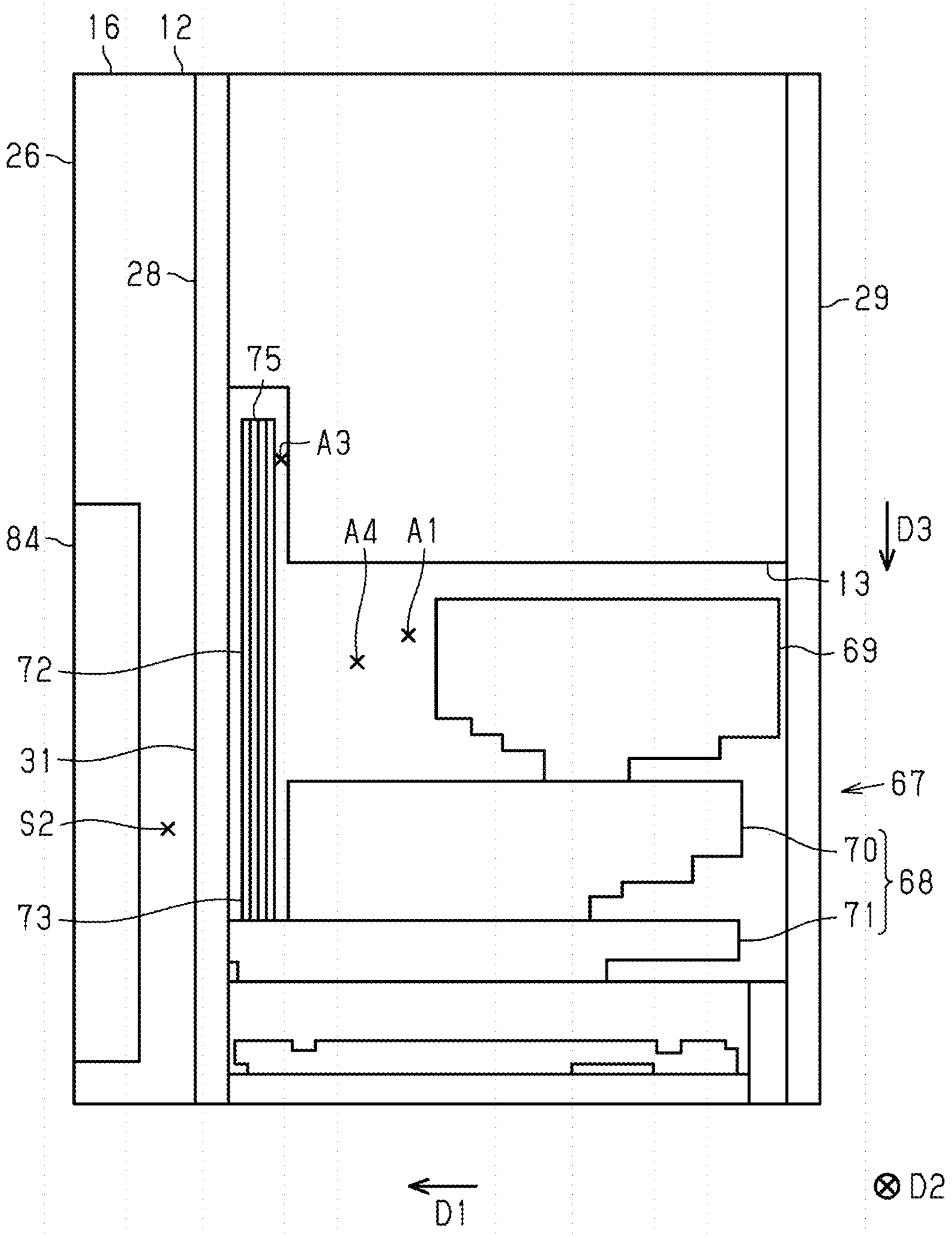
FIG. 29 is a side view of the recording device shown in FIG. 28.

As shown in FIGS. 28 and 29, the flow path space A3 may be defined by the process section 13. Specifically, the flow path space A3 may be defined by the second frame 28 and the process section 13. In this case, the flow path 72 is protected by the second frame 28 and the process section 13.

Figure 30:
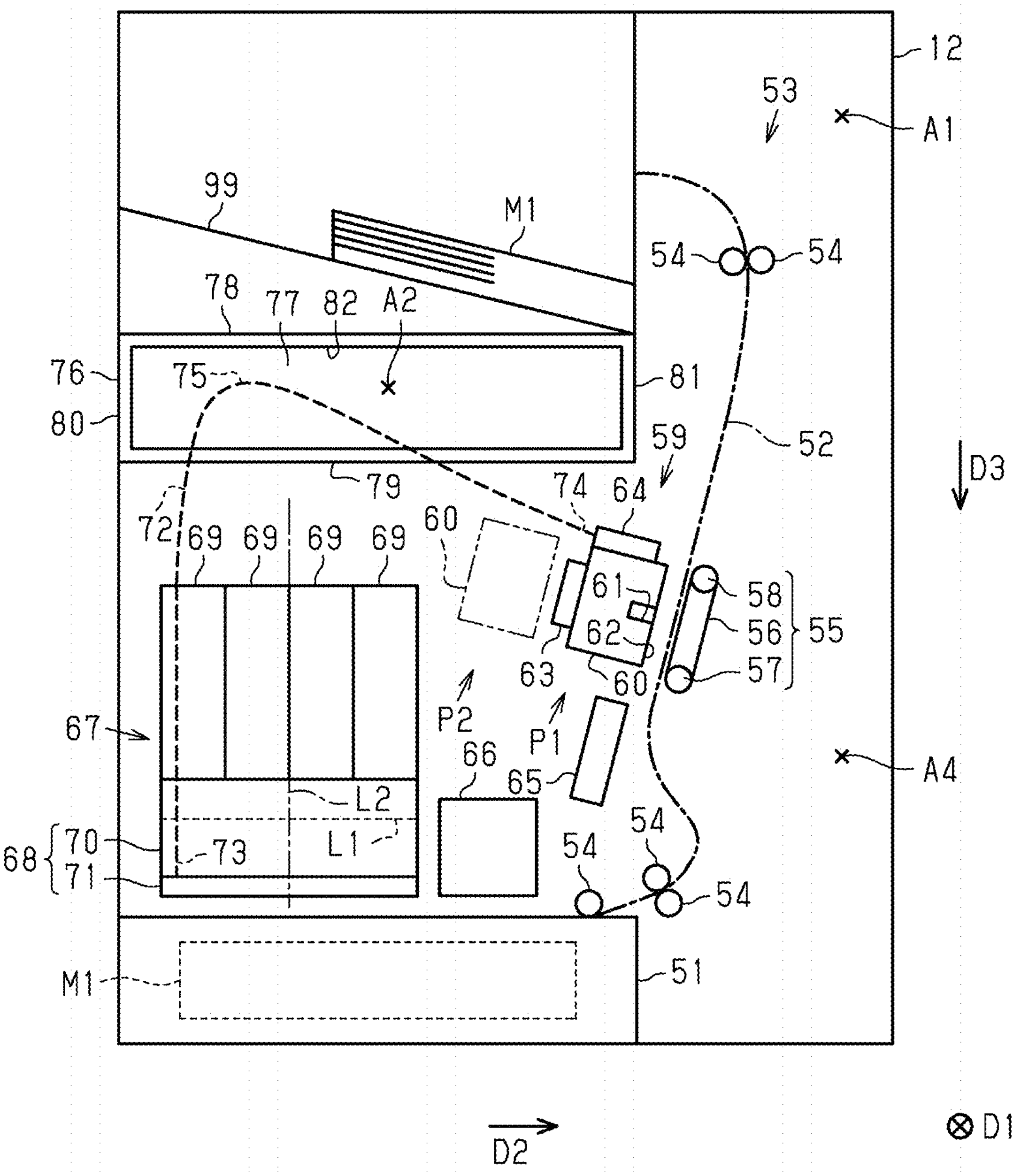
FIG. 30 is a front view of a recording device showing a modification example different from the modification example shown in FIG. 26 and the modification example shown in FIG. 28.

As shown in FIG. 30, the device main body 12 may have a stacking section 99 above the storage section 76. In this modified example, the stacking section 99 overlaps the storage section 76 when viewed from the vertical direction D3.

The liquid ejected from the recording section 59 is not limited to ink, and may be, for example, a liquid obtained by dispersing or mixing particles of a functional material in the liquid. For example, the recording section 59 may eject a liquid material containing a material such as an electrode material or a pixel material used in the manufacture of a liquid crystal display, an electroluminescence display, or a surface emitting display in the form of dispersion or dissolution.

The storage section 76 may be configured so that the user can store not only the manual of the recording device 11 but also arbitrary articles such as a container 69 for replacement, a waste liquid tank 66 for replacement, and the medium M1.

Technical Ideas

Hereinafter, technical ideas grasped from the above embodiments and modifications, and operations and effects thereof, will be described.

(A) The recording device includes a recording section that records an image on a medium by ejecting liquid onto the medium; a supply section that supplies liquid to the recording section; a substrate unit; and a frame to which the substrate unit is attached, wherein the frame is located between the supply section and the substrate unit, and the substrate unit is attached to the frame so as to define a flow space through which air flows between the substrate unit and the frame. According to the above configuration, since the air flows in the flow space, heat from the substrate unit is less likely to reach the supply section. By this, a possibility that the supply section is heated by the substrate unit is reduced.

(B) The above recording device may be configured such that the recording device further has a housing that houses the recording section, the supply section, the substrate unit, and the frame, wherein the frame has a facing surface that faces the substrate unit, the facing surface extends in a vertical direction and in one direction intersecting the vertical direction, the housing has one surface that extends along the facing surface, and a through hole that enables to bring the flow space into communication with the outside of the housing is opened on the one surface. According to the above configuration, air flows into the flow space through the through hole, or air flows out of the flow space through the through hole, so that air can flow through the flow space more easily. By this, a possibility that the supply section is heated by the substrate unit is reduced.

(C) The above recording device may be configured such that the recording device further has a shield plate that is attached to the frame and located between the supply section and the substrate unit, wherein the frame has a plurality of frame members that are located so as to provide a gap in the vertical direction, and the shield plate covers the gap between the frame members by being attached to a plurality of the frame members. According to the above configuration, a possibility that the heat of the substrate unit reaches the supply section through the gap between the frame members is reduced.

(D) The above recording device may be configured such that the plurality of frame members have facing surfaces that face the substrate unit, the facing surfaces extend in one direction and in the vertical direction, the shield plate is attached to the facing surfaces, and when the facing surfaces are viewed from the front side, the shield plate overlaps the supply section. According to the above configuration, the heat from the substrate unit to the supply section is effectively shielded by the shield plate.

(E) The above recording device may be configured such that the recording device further has a transport section that transports the medium, wherein the frame has a facing surface that faces the substrate unit, the facing surface extends in one direction and in the vertical direction, when viewed from the one direction side, the supply section is located between the frame and the transport section. According to the above configuration, the heat of the substrate unit is less likely to reach the transport section.

(F) The above recording device may be configured such that the substrate unit is a first substrate unit, the frame is a first frame, the recording device has a second substrate unit, a second frame to which the second substrate unit is attached, and a duct that brings the flow space into communication with outside of the recording device, the supply section has a flow path that connects to the recording section, the second frame is located between the supply section and the second substrate unit, and defines a flow path space in which the flow path is located, and the duct brings the flow space into communication with the flow path space. According to the above configuration, both the flow space and the flow path space communicate with the outside of the recording device by the duct. By this, the configuration of the recording device is simplified as compared with the case where the flow space and the flow path space are individually brought into communication with the outside of the recording device.

(G) The above recording device may be configured such that the recording device has a housing that houses the recording section, the supply section, the first substrate unit, the second substrate unit, the first frame, and the second frame, wherein the first frame has a first facing surface that faces the first substrate unit, the first facing surface extends in a first direction and a vertical direction, the second frame has a second facing surface that faces the second substrate unit, the second facing surface extends in a second direction and the vertical direction, the second direction is a direction different from the first direction, the housing has one surface that extends along the second facing surface, a through hole that is configured to bring the flow space into communication with outside of the housing is opened on the one surface, and the duct communicates with the through hole. According to the above configuration, the flow space and the flow path space communicate with the outside of the recording device by the through hole and the duct. By this, the possibility that the heat of the substrate unit stays in the housing is reduced.

(H) The above recording device may be configured such that the one surface is the rear surface of the housing. Typically, the user operates the recording device from the front surface side of the housing. Therefore, according to the above configuration, a possibility that air flowing into the housing through the through hole or air flowing out of the housing through the through hole reaches the user is reduced.

(I) The above recording device may be configured such that the duct is located in a position that overlaps the flow space when viewed from the first direction, and in a position that overlaps the flow path space when viewed from the second direction. According to the above configuration, the duct can easily communicate with the flow space and the flow path space.

(J) The above recording device may be configured such that the recording device further has a storage section that is configured to store an article, wherein the storage section is located above the recording section, and the flow path space is defined by the second frame and the storage section. According to the above configuration, the flow path can be protected by the second frame and the storage section.

(K) The above recording device may be configured such that the recording device further has a process section that performs processing to the medium recorded by the recording section, wherein the process section is located above the storage section and overlaps the storage section when viewed from a vertical direction. According to the above configuration, it is possible to reduce a possibility that the foot space of the recording device is increased by the process section.

(L) The above recording device may be configured such that the recording device further has a process section that performs processing to the medium recorded by the recording section, the process section is located above the recording section and the flow path space is defined by the second frame and the process section. According to the above configuration, the flow path can be protected by the second frame and the process section.

(M) The above recording device may be configured such that the recording device further has a stacking section on which the medium recorded on by the recording section is stacked, wherein the stacking section is located above the recording section and the flow path space is defined by the second frame and the stacking section. According to the above configuration, the flow path can be protected by the second frame and the stacking section.

(N) The above recording device may be configured such that an uppermost end portion of the duct is located in a position in a vertical direction that is equal to or greater than an uppermost end portion of the first substrate unit and that is equal to or greater than an uppermost end portion of the second substrate unit. Air heated in the substrate unit tends to stay in the upper portion. Therefore, according to the above configuration, the air heated in the substrate unit is likely to flow together with the air flowing into the apparatus from the duct or the air flowing out of the apparatus from the duct. By this, a possibility that the air heated in the substrate unit stays in the device is reduced.

(O) The above recording device may have a fan that discharges air from the duct to the outside of the recording device. According to the above configuration, a possibility that the supply section is heated by the substrate unit is reduced.

(P) The above recording device may have a fan that for allowing air to flow from the duct into the recording device. According to the above configuration, a possibility that the supply section is heated by the substrate unit is reduced.

(Q) The above recording device may be configured such that the first substrate unit has a power supply substrate, a power supply case that houses the power supply substrate, and an exhaust section that exhausts air from the power supply case, the duct communicates with inside of the power supply case, and the exhaust section causes air to flow out of the power supply case to the outside of the recording device through the duct. According to the above configuration, the flow space and the flow path space can also be exhausted by the exhaust section.

What is claimed is:

1. A recording device comprising:

a recording section that records an image on a medium by ejecting liquid onto the medium;

a supply section that supplies liquid to the recording section;

a substrate unit; and a frame to which the substrate unit is attached, wherein the substrate unit includes a substrate and a case accommodating the substrate, the frame is located between the supply section and the case, and the substrate unit is provided so that it defines a flow space through which air flows between the case and the frame.

2. The recording device according to claim 1, wherein the substrate unit is attached to the frame so as to define a flow space through which air flows between the substrate unit and the frame.

3. The recording device according to claim 2, further comprising:

a housing that houses the recording section, the supply section, the substrate unit, and the frame, wherein the frame has a facing surface that faces the substrate unit, the facing surface extends in a vertical direction and in one direction intersecting the vertical direction, the housing has one surface that extends along the facing surface, and a through hole that is configured to bring the flow space into communication with outside of the housing is opened in the one surface.

4. The recording device according to claim 2, further comprising:

a shield plate that is located between the supply section and the substrate unit.

5. The recording device according to claim 4, wherein the shield plate is attached to the frame, the frame has a plurality of frame members that are located so as to provide a gap in the vertical direction, and the shield plate covers the gap between the frame members by being attached to a plurality of the frame members.

6. The recording device according to claim 5, wherein the plurality of frame members have facing surfaces that face the substrate unit, the facing surfaces extend in one direction and in the vertical direction, the shield plate is attached to the facing surfaces, and when the facing surfaces are viewed from the front side, the shield plate overlaps the supply section.

7. The recording device according to claim 2, further comprising:

a transport section that transports the medium, wherein the frame has a facing surface that faces the substrate unit, the facing surface extends in one direction and in the vertical direction, and when viewed from the one direction side, the supply section is located between the frame and the transport section.

8. The recording device according to claim 2, wherein the substrate unit is a first substrate unit, the frame is a first frame, the recording device has a second substrate unit, a second frame to which the second substrate unit is attached, and a duct that brings the flow space into communication with outside of the recording device, the supply section has a flow path that connects to the recording section, the second frame is located between the supply section and the second substrate unit, and defines a flow path space in which the flow path is located, and the duct brings the flow space into communication with the flow path space.

9. The recording device according to claim 8, further comprising:

a housing that houses the recording section, the supply section, the first substrate unit, the second substrate unit, the first frame, and the second frame, wherein the first frame has a first facing surface that faces the first substrate unit, the first facing surface extends in a first direction and a vertical direction, the second frame has a second facing surface that faces the second substrate unit, the second facing surface extends in a second direction and the vertical direction, the second direction is a direction different from the first direction, the housing has one surface that extends along the second facing surface, a through hole that is configured to bring the flow space into communication with outside of the housing is opened on the one surface, and the duct communicates with the through hole.

10. The recording device according to claim 9, wherein the one surface is a rear surface of the housing.

11. The recording device according to claim 9, wherein the duct is located in a position that overlaps the flow space when viewed from the first direction, and in a position that overlaps the flow path space when viewed from the second direction.

12. The recording device according to claim 8, further comprising:

a storage section that is configured to store an article, wherein the storage section is located above the recording section, and the flow path space is defined by the second frame and the storage section.

13. The recording device according to claim 12, further comprising:

a process section that performs processing to the medium recorded by the recording section, wherein the process section is located above the storage section and overlaps the storage section when viewed from a vertical direction.

14. The recording device according to claim 8, further comprising:

a process section that performs processing to the medium recorded by the recording section, wherein the process section is located above the recording section and the flow path space is defined by the second frame and the process section.

15. The recording device according to claim 8, further comprising:

a stacking section on which the medium recorded on by the recording section is stacked, wherein the stacking section is located above the recording section and the flow path space is defined by the second frame and the stacking section.

16. The recording device according to claim 8, wherein an uppermost end portion of the duct is at a position equal to or higher than an uppermost end portion of the first substrate unit and equal to or higher than an uppermost end portion of the second substrate unit in a vertical direction.

17. The recording device according to claim 8, further comprising:

a fan that causes air to flow out of the duct to the outside of the recording device.

18. The recording device according to claim 8, further comprising:

a fan that causes air to flow from the duct into the recording device.

19. The recording device according to claim 8, wherein the first substrate unit has a power supply substrate, a power supply case that houses the power supply substrate, and an exhaust section that exhausts air from the power supply case, the duct communicates with inside of the power supply case, and the exhaust section causes air to flow out of the power supply case to the outside of the recording device through the duct.

20. The recording device according to claim 1, wherein the frame has a facing surface facing the case, and wherein the flow space is defined between the case and the facing surface of the frame.

* * * * *